(12) United States Patent
Askey et al.

(10) Patent No.: US 9,275,055 B2
(45) Date of Patent: Mar. 1, 2016

(54) METHOD AND SYSTEM FOR VISUALLY INDICATING A REPLAY STATUS OF MEDIA ITEMS ON A MEDIA DEVICE

(71) Applicant: NAPO ENTERPRISES, LLC, Wilmington, DE (US)

(72) Inventors: Waymen J. Askey, Vista, CA (US); Hugh Svendsen, Chapel Hill, NC (US)

(73) Assignee: NAPO Enterprises, LLC, Wilmington, DE (US)

( * ) Notice: Subject to any disclaimer, the term of this patent is extended or adjusted under 35 U.S.C. 154(b) by 0 days.

(21) Appl. No.: 14/617,222

(22) Filed: Feb. 9, 2015

(65) Prior Publication Data

US 2015/0154203 A1    Jun. 4, 2015

Related U.S. Application Data

(63) Continuation of application No. 14/457,574, filed on Aug. 12, 2014, now Pat. No. 8,954,883, which is a continuation of application No. 11/757,213, filed on Jun. 1, 2007, now Pat. No. 8,839,141.

(51) Int. Cl.
*G06F 17/30* (2006.01)
*G06F 3/0482* (2013.01)
*G06Q 30/02* (2012.01)
*G06F 3/0481* (2013.01)

(52) U.S. Cl.
CPC ........ *G06F 17/30053* (2013.01); *G06F 3/0481* (2013.01); *G06F 3/0482* (2013.01); *G06F 17/30867* (2013.01); *G06Q 30/02* (2013.01); *Y10S 715/978* (2013.01)

(58) Field of Classification Search
CPC ................................ G06F 17/30; G06F 3/0483
USPC .......................................................... 715/716
See application file for complete search history.

(56) References Cited

U.S. PATENT DOCUMENTS

| | | |
|---|---|---|
| 4,870,579 A | 9/1989 | Hey |
| 5,616,876 A | 4/1997 | Cluts |
| 5,621,456 A | 4/1997 | Florin et al. |
| 5,754,939 A | 5/1998 | Herz et al. |
| 5,771,778 A | 6/1998 | MacLean, IV |
| 5,890,152 A | 3/1999 | Rapaport et al. |

(Continued)

FOREIGN PATENT DOCUMENTS

| | | |
|---|---|---|
| CN | 1383328 | 12/2002 |
| CN | 1841385 | 10/2006 |

(Continued)

OTHER PUBLICATIONS

Kosugi, Naoko et al., "A Practical Query-By-Humming System for a Large Music Database," Proceedings of the 8th ACM International Conference on Multimedia, Oct. 30-Nov. 3, 2000, Los Angeles, California, copyright 2000, ACM, pp. 333-342.

(Continued)

*Primary Examiner* — Andrea Leggett

(57) ABSTRACT

A device is provided for visually indicating a replay status of media items on a media device. Aspects of the device include displaying in a graphical user interface (GUI) of the media device a representation of a first media item; displaying a profile score of the first media item that is based on user preferences; and displaying a replay score for the first media item.

17 Claims, 14 Drawing Sheets

(56) References Cited

U.S. PATENT DOCUMENTS

| | | |
|---|---|---|
| 5,918,223 A | 6/1999 | Blum et al. |
| 5,956,027 A | 9/1999 | Krishnamurthy |
| 5,963,916 A | 10/1999 | Kaplan |
| 6,134,552 A | 10/2000 | Fritz et al. |
| 6,192,340 B1 | 2/2001 | Abecassis |
| 6,195,657 B1 | 2/2001 | Rucker et al. |
| 6,201,176 B1 | 3/2001 | Yourlo |
| 6,236,990 B1 | 5/2001 | Geller et al. |
| 6,266,649 B1 | 7/2001 | Linden et al. |
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,498,955 B1 * | 12/2002 | McCarthy et al. ............... 700/1 |
| 6,526,411 B1 | 2/2003 | Ward |
| 6,567,797 B1 | 5/2003 | Schuetze et al. |
| 6,587,127 B1 | 7/2003 | Leeke et al. |
| 6,587,850 B2 | 7/2003 | Zhai |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 2,397,205 A1 * | 7/2004 | Beaupre et al. ............... 528/232 |
| 6,785,688 B2 | 8/2004 | Abajian et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,933,433 B1 | 8/2005 | Porteus et al. |
| 6,937,730 B1 | 8/2005 | Buxton |
| 6,941,275 B1 | 9/2005 | Swierczek |
| 6,941,324 B2 | 9/2005 | Plastina et al. |
| 6,947,922 B1 | 9/2005 | Glance |
| 6,976,228 B2 | 12/2005 | Bernhardson |
| 6,987,221 B2 | 1/2006 | Platt |
| 6,990,453 B2 | 1/2006 | Wang et al. |
| 7,000,188 B1 | 2/2006 | Eustace |
| 7,013,301 B2 | 3/2006 | Holm et al. |
| 7,028,082 B1 | 4/2006 | Rosenberg et al. |
| 7,035,871 B2 | 4/2006 | Hunt et al. |
| 7,072,886 B2 | 7/2006 | Salmenkaita et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,177,872 B2 | 2/2007 | Schwesig et al. |
| 7,200,852 B1 | 4/2007 | Block |
| 7,222,187 B2 | 5/2007 | Yeager et al. |
| 7,233,948 B1 | 6/2007 | Shamoon et al. |
| 7,283,992 B2 | 10/2007 | Liu et al. |
| 7,296,032 B1 | 11/2007 | Beddow |
| 7,296,285 B1 | 11/2007 | Jun et al. |
| 7,321,923 B1 | 1/2008 | Rosenberg et al. |
| 7,340,481 B1 | 3/2008 | Baer et al. |
| 7,360,160 B2 | 4/2008 | Matz |
| 7,437,364 B1 | 10/2008 | Fredricksen et al. |
| 7,463,890 B2 | 12/2008 | Herz et al. |
| 7,496,623 B2 | 2/2009 | Szeto et al. |
| 7,504,576 B2 | 3/2009 | Georges |
| 7,509,291 B2 | 3/2009 | McBride et al. |
| 7,548,915 B2 | 6/2009 | Ramer et al. |
| 7,580,932 B2 | 8/2009 | Plastina et al. |
| 7,590,546 B2 | 9/2009 | Chuang |
| 7,594,246 B1 | 9/2009 | Billmaier et al. |
| 7,614,006 B2 | 11/2009 | Molander |
| 7,680,959 B2 | 3/2010 | Svendsen |
| 7,720,871 B2 | 5/2010 | Rogers et al. |
| 7,941,764 B2 | 5/2011 | Svendsen et al. |
| 8,005,841 B1 | 8/2011 | Walsh et al. |
| 8,059,646 B2 | 11/2011 | Svendsen et al. |
| 8,285,595 B2 | 10/2012 | Svendsen |
| 2001/0013009 A1 | 8/2001 | Greening et al. |
| 2001/0021914 A1 | 9/2001 | Jacobi et al. |
| 2002/0002483 A1 | 1/2002 | Siegel et al. |
| 2002/0002899 A1 | 1/2002 | Gjerdingen et al. |
| 2002/0019858 A1 | 2/2002 | Kaiser et al. |
| 2002/0037083 A1 | 3/2002 | Weare et al. |
| 2002/0052207 A1 | 5/2002 | Hunzinger |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0087565 A1 | 7/2002 | Hoekman et al. |
| 2002/0099697 A1 | 7/2002 | Jensen-Grey |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138630 A1 | 9/2002 | Solomon et al. |
| 2002/0138836 A1 | 9/2002 | Zimmerman |
| 2002/0157096 A1 | 10/2002 | Hane et al. |
| 2002/0165793 A1 | 11/2002 | Brand et al. |
| 2002/0178057 A1 | 11/2002 | Bertram et al. |
| 2002/0199194 A1 | 12/2002 | Ali |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0033347 A1 | 2/2003 | Bolle et al. |
| 2003/0045953 A1 | 3/2003 | Weare |
| 2003/0045954 A1 | 3/2003 | Weare et al. |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0089218 A1 | 5/2003 | Gang et al. |
| 2003/0110503 A1 | 6/2003 | Perkes |
| 2003/0115167 A1 | 6/2003 | Sharif et al. |
| 2003/0135513 A1 * | 7/2003 | Quinn et al. ............... 707/102 |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0217055 A1 | 11/2003 | Lee et al. |
| 2003/0229537 A1 | 12/2003 | Dunning et al. |
| 2003/0233241 A1 | 12/2003 | Marsh |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019608 A1 | 1/2004 | Obrador |
| 2004/0034441 A1 | 2/2004 | Eaton et al. |
| 2004/0073919 A1 | 4/2004 | Gutta |
| 2004/0078383 A1 | 4/2004 | Mercer |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 * | 7/2004 | Yasushi et al. ............... 707/3 |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0139059 A1 | 7/2004 | Conroy et al. |
| 2004/0158870 A1 | 8/2004 | Paxton et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0267604 A1 | 12/2004 | Gross |
| 2005/0021420 A1 | 1/2005 | Michelitsch et al. |
| 2005/0021678 A1 | 1/2005 | Simyon et al. |
| 2005/0026559 A1 | 2/2005 | Khedouri |
| 2005/0038819 A1 | 2/2005 | Hicken et al. |
| 2005/0038876 A1 | 2/2005 | Chaudhuri |

(56) References Cited

U.S. PATENT DOCUMENTS

| | | |
|---|---|---|
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071221 A1 | 3/2005 | Selby |
| 2005/0076056 A1 | 4/2005 | Paalasmaa et al. |
| 2005/0091107 A1 | 4/2005 | Blum |
| 2005/0108233 A1 | 5/2005 | Metsatahti et al. |
| 2005/0120053 A1 | 6/2005 | Watson |
| 2005/0125222 A1 | 6/2005 | Brown et al. |
| 2005/0131866 A1 | 6/2005 | Badros |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0177516 A1 | 8/2005 | Vandewater et al. |
| 2005/0177568 A1 | 8/2005 | Diamond et al. |
| 2005/0187943 A1 | 8/2005 | Finke-Anlauff et al. |
| 2005/0192987 A1 | 9/2005 | Marsh |
| 2005/0197961 A1 | 9/2005 | Miller et al. |
| 2005/0228830 A1 | 10/2005 | Plastina et al. |
| 2005/0234995 A1 | 10/2005 | Plastina et al. |
| 2005/0240661 A1 | 10/2005 | Heller et al. |
| 2005/0246391 A1 | 11/2005 | Gross |
| 2005/0246740 A1 | 11/2005 | Teraci |
| 2005/0251455 A1 | 11/2005 | Boesen |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278364 A1 | 12/2005 | Kamen |
| 2005/0278377 A1 | 12/2005 | Mirrashidi et al. |
| 2005/0278758 A1 | 12/2005 | Bodleander |
| 2005/0283791 A1 | 12/2005 | McCarthy et al. |
| 2005/0286546 A1 | 12/2005 | Bassoli et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020962 A1 | 1/2006 | Stark et al. |
| 2006/0026048 A1 | 2/2006 | Kolawa et al. |
| 2006/0032363 A1 | 2/2006 | Platt |
| 2006/0048059 A1 | 3/2006 | Etkin |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0117260 A1 | 6/2006 | Sloo et al. |
| 2006/0126135 A1 | 6/2006 | Stevens et al. |
| 2006/0129544 A1 | 6/2006 | Yoon et al. |
| 2006/0130120 A1 | 6/2006 | Brandyberry et al. |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1* | 8/2006 | Beaupre et al. ............... 715/727 |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224435 A1 | 10/2006 | Male et al. |
| 2006/0227673 A1 | 10/2006 | Yamashita et al. |
| 2006/0230065 A1 | 10/2006 | Plastina et al. |
| 2006/0241901 A1 | 10/2006 | Hanus et al. |
| 2006/0242178 A1 | 10/2006 | Butterfield et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0254409 A1 | 11/2006 | Withop |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0288074 A1 | 12/2006 | Rosenberg |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0011095 A1 | 1/2007 | Vilcauskas et al. |
| 2007/0014536 A1 | 1/2007 | Hellman |
| 2007/0022437 A1 | 1/2007 | Gerken |
| 2007/0025194 A1 | 2/2007 | Morse et al. |
| 2007/0028171 A1 | 2/2007 | MacLaurin |
| 2007/0033419 A1 | 2/2007 | Kocher et al. |
| 2007/0043766 A1 | 2/2007 | Nicholas et al. |
| 2007/0044010 A1 | 2/2007 | Sull et al. |
| 2007/0053268 A1 | 3/2007 | Crandall et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0078895 A1 | 4/2007 | Hsieh et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094215 A1 | 4/2007 | Toms et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0124325 A1 | 5/2007 | Moore et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0220100 A1 | 9/2007 | Rosenberg |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0265870 A1 | 11/2007 | Song et al. |
| 2007/0265979 A1 | 11/2007 | Hangartner |
| 2007/0266049 A1 | 11/2007 | Cohen et al. |
| 2007/0266402 A1 | 11/2007 | Pawlak et al. |
| 2007/0269169 A1 | 11/2007 | Stix et al. |
| 2007/0271287 A1 | 11/2007 | Acharya et al. |
| 2007/0277202 A1 | 11/2007 | Lin et al. |
| 2007/0282472 A1 | 12/2007 | Seldman |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |

(56) References Cited

U.S. PATENT DOCUMENTS

| | | |
|---|---|---|
| 2008/0032723 A1 | 2/2008 | Rosenberg |
| 2008/0033959 A1 | 2/2008 | Jones |
| 2008/0040313 A1 | 2/2008 | Schachter |
| 2008/0040474 A1 | 2/2008 | Zuckerberg et al. |
| 2008/0046948 A1 | 2/2008 | Verosub |
| 2008/0052371 A1 | 2/2008 | Partovi et al. |
| 2008/0052630 A1 | 2/2008 | Rosenbaum |
| 2008/0059422 A1 | 3/2008 | Tenni et al. |
| 2008/0059576 A1 | 3/2008 | Liu et al. |
| 2008/0062318 A1 | 3/2008 | Ellis et al. |
| 2008/0091771 A1 | 4/2008 | Allen et al. |
| 2008/0120501 A1 | 5/2008 | Jannink et al. |
| 2008/0126191 A1 | 5/2008 | Schiavi |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0140717 A1 | 6/2008 | Rosenberg et al. |
| 2008/0141136 A1 | 6/2008 | Ozzie et al. |
| 2008/0141315 A1 | 6/2008 | Ogilvie |
| 2008/0147482 A1 | 6/2008 | Messing et al. |
| 2008/0147711 A1 | 6/2008 | Spiegelman et al. |
| 2008/0189295 A1 | 8/2008 | Khedouri et al. |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0201446 A1 | 8/2008 | Svendsen |
| 2008/0208823 A1 | 8/2008 | Hicken |
| 2008/0209482 A1 | 8/2008 | Meek et al. |
| 2008/0222546 A1 | 9/2008 | Mudd et al. |
| 2008/0235632 A1 | 9/2008 | Holmes |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0306826 A1 | 12/2008 | Kramer et al. |
| 2008/0319833 A1 | 12/2008 | Svendsen |
| 2009/0007198 A1 | 1/2009 | Lavender et al. |
| 2009/0049045 A1 | 2/2009 | Askey et al. |
| 2009/0055396 A1 | 2/2009 | Svendsen et al. |
| 2009/0055467 A1 | 2/2009 | Petersen |
| 2009/0055759 A1 | 2/2009 | Svendsen |
| 2009/0076881 A1 | 3/2009 | Svendsen |
| 2009/0077220 A1 | 3/2009 | Svendsen et al. |
| 2009/0077499 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0129671 A1 | 5/2009 | Hu et al. |
| 2009/0144325 A1 | 6/2009 | Chastagnol et al. |
| 2009/0144326 A1 | 6/2009 | Chastagnol et al. |
| 2010/0005116 A1 | 1/2010 | Yoon et al. |
| 2010/0031366 A1 | 2/2010 | Knight et al. |
| 2010/0063975 A1 | 3/2010 | Hayes |
| 2012/0041902 A1 | 2/2012 | Svendsen et al. |
| 2012/0042245 A1 | 2/2012 | Askey et al. |

FOREIGN PATENT DOCUMENTS

| | | |
|---|---|---|
| EP | 1536352 | 6/2005 |
| EP | 1791130 | 5/2007 |
| GB | 2372850 | 9/2002 |
| JP | 2005321668 | 11/2005 |
| WO | WO 01/84353 | 11/2001 |
| WO | WO 02/21335 | 3/2002 |
| WO | WO 2004/017178 | 2/2004 |
| WO | WO 2004/043064 | 5/2004 |
| WO | WO 2005/026916 | 3/2005 |
| WO | WO 2005/038666 | 4/2005 |
| WO | WO 2005/071571 | 8/2005 |
| WO | WO 2006/075032 | 7/2006 |
| WO | WO 2006/126135 | 11/2006 |

OTHER PUBLICATIONS

"Amazon.com: Online Shopping for Electronics, Apparel, Computers, Books, DVDs & m . . . ," at <http://www.amazon.com/>, copyright 1996-2007, Amazon.com, Inc., printed Oct. 26, 2007, 4 pages.

Huang, Yao-Chang et al., "An Audio Recommendation System Based on Audio Signature Description Scheme in MPEG-7 Audio," IEEE International Conference on Multimedia and Expo (ICME), Jun. 27-30, 2004, IEEE, pp. 639-642.

"Apple—iPod + iTunes," at <http://www.apple.com/itunes/>, copyright 2007 by Paramount Pictures, printed Feb. 7, 2007, 2 pages.

"Apple—iPod classic," at <http://www.apple.com/ipodclassic/>, printed Oct. 26, 2007, 1 page.

"Babulous :: Keep it loud," at <http://www.babulous.com/home.jhtml>, copyright 2009, Babulous, Inc., printed Mar. 26, 2009, 2 pages.

"Better Propaganda—Free MP3s and music videos," at <http://www.betterpropaganda.com/>, copyright 2004-2005, betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

"The Bridge Ratings Report—The Impact of Wireless Internet," Luce Performance Group, International, study from interviews conducted between Jul. 5, 2007 and Aug. 31, 2007, date of publication unknown, file obtained Dec. 13, 2007, 6 pages.

Mitchell, Bradley, "Cable Speed—How Fast is Cable Modem Internet?," at <http://www.compnetworking.about.com/od/internetaccessbestuses/f/cablespeed.htm>, copyright 2005, About, Inc., printed Feb. 24, 2010, 2 pages.

"The Classic TV Database—Your Home for Classic TV!—www.classic-tv.com," http://www.classic-tv.com, copyright the Classic TV Database—www.classic-tv.com, printed Feb. 7, 2007, 3 pages.

Abstract, Chinese Patent Publication No. 1383328A, published Dec. 4, 2002, "Method and System for Recommending Program," Chinese Patent Application No. 20021018177, filed Apr. 23, 2002, Applicant: NEC Corp, Inventors: Hidegi Hane and Shinichiro Kamei, obtained from http://www.espacenet.com, as the abstract to related US Patent Application Publication No. 2002/0157096 A1, 2 pages.

Abstract, Chinese Patent Publication No. 1841385A, published Oct. 4, 2006, "Method of supplying content data and playlist thereof," Chinese Patent Application No. 20061073372, filed Mar. 31, 2006, Applicant: Sony Corp, Inventor: Takeh Miyajima Yasushi Yamashi, obtained from http://www.espacenet.com, 1 page.

"Developer News Archive," Audacity Wiki, page last modified on Sep. 10, 2008, contains information dating back to May 4, 2008,retrieved Jun. 4, 2009 from <http://audacityteam.org/wiki/index.php?title=Developer_News_Archive>, 10 pages.

"Digital Tech Life >> Download of the Week," earliest post Sep. 30, 2005, latest post Jul. 2, 2006, at <http://www.digitaltechlife.com/category/download-of-the-week/>, printed Feb. 16, 2007, 9 pages.

"Digital Music News," at <http://www.digitalmusicnews.com/results?title=musicstrands>, copyright Jun. 2003 Digital Music News, earliest post Aug. 2005, latest post May 2006, printed Aug. 8, 2006, 5 pages.

"GenieLab::Music Recommendation System," at <http://genielab.com/>, from the Internet Archive on Aug. 13, 2006, copyright 2005, GenieLab, LLC, printed Oct. 30, 2007, 1 page.

"Goombah" Preview, at <http://www.goombah.com/preview.html>, printed Jan. 8, 2008, 5 pages.

"Gracenote," found at <http://www.gracenote.com>, printed Feb. 7, 2007, available on Internet Archive at least as early as Jan. 2006, 1 page.

(56) References Cited

OTHER PUBLICATIONS

"Gracenote Playlist," Product Overview, Revised Dec. 29, 2005, copyright 2005, Gracenote, 2 pages.
"Gracenote Playlist Plus," Product Overview, Revised Dec. 29, 2005, copyright 2005, Gracenote, 2 pages.
"How many songs are in your iTunes Music library (or libraries in total, if you use more than one)?," at <http://www.macoshints.com/polls/index.php?pid=itunesmusiccount>, includes postings dated as early as Jun. 2008, printed Feb. 24, 2010, copyright 2010, Mac Publishing LLC, 10 pages.
"Zune.net—How-To—Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"Hulu—About," at <http://www.hulu.com/about/product_tour>, copyright 2010, Hulu LLC, appears to have been accessible as early as early 2008, printed Jun. 15, 2010, 2 pages.
Nilsson, Martin, "id3v2.4.0—frames—ID3.org," at <http://www.id3.org/id3v2.4.0-frames>, dated Nov. 1, 2000, last updated Dec. 18, 2006, copyright 1998-2009, printed Jun. 15, 2010, 31 pages.
"Identifying iPod models," at <http://support.apple.com/kb/HT1353>, page last modified Jan. 15, 2010, includes information dating back to 2001,printed Feb. 24, 2010, 13 pages.
"IEEE 802.11—Wlkipedia, the free encyclopedia," http://en.wikipedia.org/wiki/IEEE_802.11, printed Oct. 26, 2007, 5 pages.
"iLikeTM—Home," found at <http://www.ilike.com/>, copyright 2007, iLike, printed May 17, 2007, 2 pages.
Holzner, Steven, overview of book "Inside JavaScript," published Aug. 28, 2002, New Riders, website copyright 2009, Safari Books Online, 7 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Last.fm—Wikipedia, the free encyclopedia," at <http://en.wikipedia.org/wiki/Last.fm>, last modified on Aug. 8, 2006, printed Aug. 8, 2006, 7 pages.
"LAUNCHcast Radio—Yahoo! Messenger," http://messenger.yahoo.com/launch.php, copyright 2007 Yahoo! Inc., printed Nov. 8, 2007, 1 page.
Mascia, J. and Reddy, S., "cs219 Project Report—Lifetrak: Music in Tune With Your Life," Department of Electrical Engineering, UCLA '06, Los Angeles, California, copyright 2006, ACM, 11 pages.
Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.
"LimeWire—Wikipedia, the free encyclopedia," at <http://en.wikipedia.org/wiki/LimeWire>, last modified Aug. 6, 2006, printed Aug. 8, 2006, 2 pages.
"Listen with Last.fm and fuel the social music revolution," at <http://www.last.fm/tour/>, copyright 2002-2007, Last.fm Ltd., printed Oct. 4, 2007, 1 page.
"Liveplasma music, movies, search engine and discovery engine," at <http://www.liveplasma.com>, printed May 17, 2007, 1 page.
"Loomia Personalized Recommendations for Media, Content and Retail Sites," at <http://www.loomia.com/>, copyright 2006-2007, Loomia Inc., printed Feb. 7, 2007, 2 pages.
"Mercora—Music Search and Internet Radio Network," at <http://www.mercora.com/v6/_front/web.jsp>, printed Feb. 7, 2007, 1 page.
"Mercora—Music Search and Internet Radio Network," at <http://www.mercora.com/overview.asp>, copyright 2004-2006, Mercora, Inc., printed Aug. 8, 2006, 1 page.
"Mongomusic.com—The Best Download mp3 Resource and Information. This website is for sale!," http://www.mongomusic.com/, printed May 17, 2007, 2 pages.

"MP3 music download website, eMusic," at <http://www.emusic.com/>, copyright 2007, eMusic.com Inc., printed Feb. 7, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"Music Recommendations 1.0—MacUpdate," at <http://www.macupdate.com/info.php/id/19575>, Oct. 4, 2005, printed Feb. 16, 2007, 1 page.
Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, The Netherlands, 2003, 23 pages.
"MusicGremlin," at <http://www.musicgremlin.com/Static-Contentaspx?id=3>, copyright 2005, 2006, 2007, MusicGremlin, Inc., printed Oct. 26, 2007, 1 page.
"MusicIP—The Music Search Engine," at <http://www.musicip.com/>, copyright 2006-2007, MusicIP Corporation, printed Feb. 7, 2007, 1 page.
"musicstrands.com—Because Music is Social," brochure, copyright 2006, MusicStrands, Inc., 2 pages.
"MyStrands Download," at <http://www.mystrands.com/overview.vm>, copyright 2003-2007, MediaStrands, Inc., printed Feb. 7, 2007, 3 pages.
"MyStrands for Windows 0.7.3 Beta," copyright 2002-2006, ShareApple.com networks, printed Jul. 16, 2007, 3 pages.
"MyStrands for Windows Change Log," at <http://www.mystrands.com/mystrands/windows/changelog.vm>, earliest log dated Feb. 2006, printed Jul. 16, 2007, 6 pages.
"MyStrands Labs: Patent-pending Technologies," at <http://labs.mystrands.com/patents.html>, earliest description from Nov. 2004,printed Feb. 7, 2007, 5 pages.
"Napster—All the Music You Want," at <http://www.napster.com/using_napster/all_the_music_you_want.html>, copyright 2003-2006, Napster, LLC, printed Feb. 7, 2007, 2 pages.
"Not safe for work—Wikipedia, the free encyclopedia," http://en.wikipedia.org/wiki/Work_safe, printed Nov. 8, 2007, 2 pages.
"Outlook Home Page—Microsoft Office Online," http://office.microsoft.com/en-us/outlook/default.aspx, copyright 2007 Microsoft Corporation, printed Nov. 8, 2007, 1 page.
Pouwelse et al., "P2P-based PVR Recommendation using Friends, Taste Buddies and Superpeers," Workshop: Beyond Personalization 2005, IUI 2005, Jan. 9, 2005, San Diego, California, 6 pages.
PAJ 2005-321672.
"FAQ," at <http://blog.pandora.com/faq/>, copyright 2005-2006, Pandora Media, Inc., printed Aug. 8, 2006, 20 pages.
"Pandora Internet Radio—Find New Music, Listen to Free Web Radio," at <http://www.pandora.com/>, copyright 2005-2007, Pandora Media, Inc., printed Feb. 7, 2007, 1 page.
"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.
Xiong, Li and Liu, Ling, "PeerTrust: Supporting Reputation-Based Trust for Peer-to-Peer Electronic Communities," IEEE Transactions on Knowledge and Data Engineering, vol. 16, No. 7, Jul. 2004, copyright 2004, IEEE, 15 pages.
"Polaris Wireless Deploys Network Optimization Product for Wireless Carrier Market," Dec. 17, 2007, Polaris Wireless, Santa Clara, California, originally found at <http://www.polariswireless.com/dnloads/NetOpt%2012-16-07.pdf>, obtained from Internet Archive, 2 pages.
"Press Release: UGC Whitepaper released—eModeration," Feb. 22, 2007, at <http://www.emoderation.com/news/press-release-ugc-whitepaper-released>, copyright 2006-2009, eModeration, printed Apr. 28, 2009, 3 pages.
Sarwar, Badrul M. et al., "Recommender Systems for Large-scale E-Commerce: Scalable Neighborhood Formation Using Clustering," Proceedings of the Fifth ♂ International Conference on Computer and Information Technology, Dec. 27-28, 2002, East West University, Dhaka, Bangladesh, 6 pages.

(56) References Cited

OTHER PUBLICATIONS

Hill et al., "Recommending and Evaluating Choices in a Virtual Community of Use," at <http://delivery.acm.org/10.1145/230000/223929/p1...1=GUIDE&dl=GUIDE&CFID=101371626 &CFTOKEN=47493911>, Proceedings of CHI 1995, May 7-11, 1995, Denver, Colorado, printed Sep. 10, 2010, 15 pages.

"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestream%20review%20of%20personalization&source=web&cd=1&ved=0CDcQFjAA&url=http%3A%2F%2Fwww.behavioraltargeting.info%2Fdownloadattachment.php%3Fald%3Dcf74d490a8b97edd535b4ccdbfd0df55%26articleId%3D31&ei=C2jeTr71AurZ0QGCgsGyBw&usg=AFQjCNEBLn7jJCDh-VYty3h79uFKGFBkRw>, 13 pages.

"Rhapsody—Full-length music, videos and more—FREE," http://www.rhapsody.com/welcome.html, copyright 2001-2007 Listen.com, printed Feb. 7, 2007, 1 page.

"Ringo: Social Information Filtering for Music Recommendation," http://jolomo.net/ringo.html, printed Aug. 3, 2009, 1 page.

"RYM FAQ—Rate Your Music," at <http://rateyourmusic.com/faq/>, copyright 2000-2007, rateyourmusic.com, printed Nov. 8, 2007, 14 pages.

"Songbird," at <http://getsongbird.com/>, copyright 2010, Songbird, printed Jun. 15, 2010, 2 pages.

"SongReference," at <http://songreference.com/>, copyright 2008, SongReference.com, printed Jun. 15, 2010, 1 page.

"Soundflavor," at <http://www.soundflavor.com/>, copyright 2003-2007, Soundflavor, Inc., printed Feb. 7, 2007, 1 page.

"Take a look at the Future of Mobile Music—MUSIC GURU," at <http://www.symbian-freak.com/news/006/02/music_guru.htm> Feb. 23, 2006, copyright 2005, Symbian freak, printed Feb. 7, 2007, 3 pages.

"That canadian girl >> Blog Archive >> GenieLab," posted Feb. 22, 2005, at <http://www.thatcanadiangirl.co.uk/blog/2005/02/22/genielab/>, copyright 2007, Vero Pepperrell, printed Feb. 16, 2007, 3 pages.

Barrie-Anthony, Steven, "That song sounds familiar," Los Angeles Times, Feb. 3, 2006, available from <http://www.calendarlive.com/printedition/calendar/cl-et-pandora3feb03,0,7458778.story?track=tottext,0,19432.story?track=tothtml>, printed Feb. 3, 2006, 5 pages.

Nealon, Andrew D., "The Daily Barometer—GenieLab.com grants music lovers' wishes," posted Feb. 16, 2005, at <http://media.barometer.orst.edu/home/index.cfm?event=displayArticlePrinterFriendly&uSt . . . >, copyright 2007, The Daily Barometer, printed Feb. 16, 2007, 2 pages.

"The Internet Movie Database (IMDb)," http://www.imdb.com/, copyright 1990-2007 Internet Movie Database Inc., printed Feb. 7, 2007, 3 pages.

"Thunderbird—Reclaim your inbox," http://www.mozilla.com/en-US/thunderbird/, copyright 2005-2007 Mozilla, printed Nov. 8, 2007, 2 pages.

"Tours Profile," at <http://mog.com/Tour>, copyright 2006-2009, Mog Inc., printed Aug. 3, 2009, 11 pages.

"Trillian (software)—Wikipedia, the free encyclopedia," http://en.wikipedia.org/wiki/Trillian_(instant_messenger), printed Nov. 8, 2007, 11 pages.

"Try Napster free for 7 Days—Play and download music without paying per song.," http://www.napster.com/choose/index.html, copyright 2003-2007 Napster, LLC, printed Feb. 7, 2007, 1 page.

"UpTo11.net—Music Recommendations and Search," at <http://www.upto11.net/>, copyright 2005-2006, Upto11.net, printed Feb. 7, 2007, 1 page.

"Webjay—Playlist Community," at <http://www.webjay.org/>, copyright 2006, Yahoo! Inc., printed Feb. 7, 2007, 5 pages.

"Welcome to the MUSICMATCH Guide," at <http://www.mmguide.musicmatch.com/>, copyright 2001-2004, Musicmatch, Inc., printed Feb. 7, 2007, 1 page.

"What is the size of your physical and digital music collection'?," at <http://www.musicbanter.com/general-music/47403-what-size-your-physical-digital-music-collection-12.html>, earliest posting shown: Sep. 21, 2008, printed Feb. 24, 2010, copyright 2010, Advameg, Inc., SEO by vBSEO 3.2.0 copyright 2008, Crawlability, Inc., 6 pages.

Dean, Katie, "Whose Song Is That, Anyway'?," Wired News, Feb. 12, 2003, at <http://www.wired.com/news/digiwood/1,57634-0.html>, copyright 2005, Lycos, Inc., printed Oct. 9, 2006, 3 pages.

XM Presentation, Citi Global Entertainment, Media & Telecommunications (EMT) Conference, Jan. 8-10, 2008, Phoenix, Arizona, 16 pages.

"Yahoo! Music," at <http://music.yahoo.com>, dated Jun. 20, 2005, from the Internet Archive, copyright 2005, Yahoo! Inc., printed Dec. 18, 2009, 14 pages.

"Yahoo Music Jukebox," Wikipedia, at <http://en.wikipedia.org/wiki/Yahoo_music_engine>, last modified Aug. 3, 2006, printed Aug. 8, 2006, 1 page.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo! Music," at <http://info.yahoo.com/privacy/ca/yahoo/music/>, Aug. 14, 2007, copyright 2007, Yahoo! Canada Co., obtained from the Internet Archive, printed Apr. 19, 2011, 4 pages.

"YouTube—Broadcast Yourself.," at <http://www.youtube.com/>, copyright 2007, YouTube, LLC, printed Oct. 26, 2007, 2 pages.

Kristen Nicole, "YouTube Remixer—Online Video Editing for YouTube," at <http://mashable.com/2007/06/16/youtube-remixer/>, dated Jun. 16, 2007, including a post that appears to be posted 2 years prior to Jun. 16, 2007 (Jun. 2005), printed Jan. 8, 2010, 4 pages.

\* cited by examiner

| User | Title | Artist | Genre | Decade | Location | Score |
|---|---|---|---|---|---|---|
| Hugh | Say Hey | The Tubes | Alternative | 1980's | Local | 84 |
| Gary | Dreamers Disease | New Radicals | Alternative | 1980's | Local | 82 |
| Gene | Tenderness | General Public | New Wave | 1980's | Local | 75 |
| Gene | Beautiful Day | U2 | Rock | 1980's | Local | 72 |
| Gary | Run to the Hills | Iron Maden | Metal | 1970's | Local | 72 |
| Gary | Dance in My Sleep | Dave Adams | Alternative | 1980's | Subscription | 67 |
| Hugh | Sweet Emotion | Aerosmith | Rock | 1970's | Local | 67 |
| Hugh | Running with the Devil | Van Halen | Rock | 1970's | Local | 67 |
| Gene | Allison | Elivs Costello | Alternative | 1980's | Buy/Download | 65 |
| Mike | Still Lovin' You | Scorpions | Metal | 1980's | Subscription | 64 |
| Gene | True | Spandau Ballet | Dance | 1980's | Subscription | 57 |
| Mike | Hound Dog | Elvis Costello | Rock | 1980's | Buy/Download | 54 |
| Gary | Heart of the Night | Poco | Rock | 1970's | Subscription | 50 |
| Gary | Round About | Yes | Rock | 1970's | Buy/Download | 47 |
| Waymen | Come Away With Me | Norah Jones | Jazz | 2000's | Subscription | 43 |
| Gene | Rebel Yell | Billy Idol | Punk | 1980's | Subscription | 43 |
| Waymen | So What | Miles Davis | Jazz | 1960's | Buy/Download | 37 |
| Mike | Walk the Line | Johnny Cash | Country | 1970's | Buy/Download | 37 |
| Waymen | Something More | Sugarland | Country | 2000's | Subscription | 32 |

*FIG. 6*

| User | Title | Artist | Genre | Decade | Location | Score |
|---|---|---|---|---|---|---|
| Gary | Dreamers Disease | New Radicals | Alternative | 1980's | Local | 82 |
| Gene | Tenderness | General Public | New Wave | 1980's | Local | 75 |
| Gene | Beautiful Day | U2 | Rock | 1980's | Local | 72 |
| Gary | Run to the Hills | Iron Maden | Metal | 1970's | Local | 72 |
| Gary | Dance in My Sleep | Dave Adams | Alternative | 1980's | Subscription | 67 |
| Hugh | Sweet Emotion | Aerosmith | Rock | 1970's | Local | 67 |
| Hugh | Running with the Devil | Van Halen | Rock | 1970's | Local | 67 |
| Gene | Allison | Elivs Costello | Alternative | 1980's | Buy/Download | 65 |
| Mike | Still Lovin' You | Scorpions | Metal | 1980's | Subscription | 64 |
| Gene | True | Spandau Ballet | Dance | 1980's | Subscription | 57 |
| Mike | Hound Dog | Elvis Costello | Rock | 1980's | Buy/Download | 54 |
| Gary | Heart of the Night | Poco | Rock | 1970's | Subscription | 50 |
| Gary | Round About | Yes | Rock | 1970's | Buy/Download | 47 |
| Waymen | Come Away With Me | Norah Jones | Jazz | 2000's | Subscription | 43 |
| Gene | Rebel Yell | Billy Idol | Punk | 1980's | Subscription | 43 |
| Waymen | So What | Miles Davis | Jazz | 1960's | Buy/Download | 37 |
| Mike | Walk the Line | Johnny Cash | Country | 1970's | Buy/Download | 37 |
| Waymen | Something More | Sugarland | Country | 2000's | Subscription | 32 |
| Hugh | Say Hey | The Tubes | Alternative | 1980's | Local | 1 |

*FIG. 8*

| User | Title | Artist | Genre | Decade | Location | Score |
|---|---|---|---|---|---|---|
| Gary | Dance in My Sleep | Dave Adams | Alternative | 1980's | Subscription | 67 |
| Hugh | Sweet Emotion | Aerosmith | Rock | 1970's | Local | 67 |
| Hugh | Running with the Devil | Van Halen | Rock | 1970's | Local | 67 |
| Gene | Allison | Elvis Costello | Alternative | 1980's | Buy/Download | 65 |
| Mike | Still Lovin' You | Scorpions | Metal | 1980's | Subscription | 64 |
| Gene | True | Spandau Ballet | Dance | 1980's | Subscription | 57 |
| Mike | Hound Dog | Elvis Costello | Rock | 1980's | Buy/Download | 54 |
| Gary | Heart of the Night | Poco | Rock | 1970's | Subscription | 50 |
| Gary | Round About | Yes | Rock | 1970's | Buy/Download | 47 |
| Waymen | Come Away With Me | Norah Jones | Jazz | 2000's | Subscription | 43 |
| Gene | Rebel Yell | Billy Idol | Punk | 1980's | Subscription | 43 |
| Waymen | So What | Miles Davis | Jazz | 1960's | Buy/Download | 37 |
| Mike | Walk the Line | Johnny Cash | Country | 1970's | Buy/Download | 37 |
| Waymen | Something More | Sugarland | Country | 2000's | Subscription | 32 |
| Hugh | Say Hey | The Tubes | Alternative | 1980's | Local | 5 OF 84 |
| Gary | Dreamers Disease | New Radicals | Alternative | 1980's | Local | 4 OF 82 |
| Gene | Tenderness | General Public | New Wave | 1980's | Local | 3 OF 75 |
| Gene | Beautiful Day | U2 | Rock | 1980's | Local | 2 OF 72 |
| Gary | Run to the Hills | Iron Maden | Metal | 1970's | Local | 1 OF 72 |

FIG. 11

| User | Title | Artist | Genre | Decade | Location | Score |
|---|---|---|---|---|---|---|
| Gary | Dance in My Sleep | Dave Adams | Alternative | 1980's | Subscription | 67 |
| Gary | Heart of the Night | Poco | Rock | 1970's | Subscription | 50 |
| Gary | Round About | Yes | Rock | 1970's | Buy/Download | 47 |
| Gary | Dreamers Disease | New Radicals | Alternative | 1980's | Local | 4 OF 82 |
| Gary | Run to the Hills | Iron Maden | Metal | 1970's | Local | 1 OF 72 |
| Gene | Allison | Elivs Costello | Alternative | 1980's | Buy/Download | 65 |
| Gene | True | Spandau Ballet | Dance | 1980's | Subscription | 57 |
| Gene | Rebel Yell | Billy Idol | Punk | 1980's | Subscription | 43 |
| Gene | Tenderness | General Public | New Wave | 1980's | Local | 3 OF 75 |
| Gene | Beautiful Day | U2 | Rock | 1980's | Local | 2 OF 72 |
| Hugh | Sweet Emotion | Aerosmith | Rock | 1970's | Local | 67 |
| Hugh | Running with the Devil | Van Halen | Rock | 1970's | Local | 67 |
| Hugh | Say Hey | The Tubes | Alternative | 1980's | Local | 5 OF 84 |
| Mike | Still Lovin' You | Scorpions | Metal | 1980's | Subscription | 64 |
| Mike | Hound Dog | Elvis Costello | Rock | 1980's | Buy/Download | 54 |
| Mike | Walk the Line | Johnny Cash | Country | 1970's | Buy/Download | 37 |
| Waymen | Come Away With Me | Norah Jones | Jazz | 2000's | Subscription | 43 |
| Waymen | So What | Miles Davis | Jazz | 1960's | Buy/Download | 37 |
| Waymen | Something More | Sugarland | Country | 2000's | Subscription | 32 |

FIG. 12

| User | Title | Artist | Genre | Decade | Location | Score |
|---|---|---|---|---|---|---|
| Hugh | Sweet Emotion | Aerosmith | Rock | 1970's | Local | 73 |
| Hugh | Running with the Devil | Van Halen | Rock | 1970's | Local | 73 |
| Gary | Dance in My Sleep | Dave Adams | Alternative | 1980's | Subscription | 62 |
| Gene | Allison | Elivs Costello | Alternative | 1980's | Buy/Download | 60 |
| Mike | Still Lovin' You | Scorpions | Metal | 1980's | Subscription | 60 |
| Gene | True | Spandau Ballet | Dance | 1980's | Subscription | 55 |
| Mike | Hound Dog | Elvis Costello | Rock | 1980's | Buy/Download | 53 |
| Gary | Heart of the Night | Poco | Rock | 1970's | Subscription | 50 |
| Gary | Round About | Yes | Rock | 1970's | Buy/Download | 48 |
| Gene | Rebel Yell | Billy Idol | Punk | 1980's | Subscription | 45 |
| Waymen | Come Away With Me | Norah Jones | Jazz | 2000's | Subscription | 45 |
| Mike | Walk the Line | Johnny Cash | Country | 1970's | Buy/Download | 40 |
| Waymen | So What | Miles Davis | Jazz | 1960's | Buy/Download | 40 |
| Waymen | Something More | Sugarland | Country | 2000's | Subscription | 37 |
| Hugh | Say Hey | The Tubes | Alternative | 1980's | Local | 5 OF 86 |
| Gary | Dreamers Disease | New Radicals | Alternative | 1980's | Local | 3 OF 83 |
| Gene | Tenderness | General Public | New Wave | 1980's | Local | 2 OF 83 |
| Gary | Run to the Hills | Iron Maden | Metal | 1970's | Local | 1 OF 79 |
| Gene | Beautiful Day | U2 | Rock | 1980's | Local | 1 OF 64 |

*FIG. 13*

METHOD AND SYSTEM FOR VISUALLY INDICATING A REPLAY STATUS OF MEDIA ITEMS ON A MEDIA DEVICE

CROSS-REFERENCE TO RELATED APPLICATIONS

This patent application is a Continuation of U.S. patent application Ser. No. 14/457,574 filed Aug. 12, 2014, entitled "Method And System For Visually Indicating A Reply Status Of Media Items On A Media Device", which is a Continuation of U.S. patent application Ser. No. 11/757,213, filed Jun. 1, 2007, entitled "Method And System For Visually Indicating A Reply Status Of Media Items On A Media Device," the disclosures of which are hereby incorporated herein by reference in their entireties.

BACKGROUND

In recent years, there has been an enormous increase in the amount of digital media, such as music, available online. Services such as Apple's iTunes enable users to legally purchase and download music. Other services such as Yahoo! Music Unlimited and RealNetwork's Rhapsody provide access to millions of songs for a monthly subscription fee. As a result, music has become much more accessible to listeners worldwide. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributions. Companies using this type of approach include Pandora, SoundFlavor, MusicIP, and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of their songs, their favorite playlists, and the like. Companies using this technology include Last.fm, Music Strands, WebJay, Mercora, betterPropaganda, Loomia, eMusic, musicmatch, genielab, upto11, Napster, and iTunes with its celebrity playlists.

The problem with these traditional recommendation systems is that they fail to consider peer influences. For example, the music that a particular teenager listens to may be highly influenced by the music listened to by a group of the teenager's peers, such as his or her friends. As such, there is a need for a music recommendation system and method that recommends music to a user based on the listening habits of a peer group.

SUMMARY

The present invention provides a computer-implemented method and system for visually indicating a replay status of media items on a media device. Aspects of the method and system include displaying in a graphical user interface (GUI) of the media device a representation of a first media item; displaying a profile score of the first media item that is based on user preferences; and displaying a replay score for the first media item.

According to the method and system disclosed herein, by displaying both a profile score as well as a replay score, the user is given a visual indication of both the user's preferences for the media item as well as a dynamic indication of the replay status of the media item, which can change as events and/or time pass.

BRIEF DESCRIPTION OF SEVERAL VIEWS OF THE DRAWINGS

FIG. 6 illustrates an exemplary graphical user interface (GUI) for displaying a playlist for the peer devices including both local and recommended media items according to an exemplary embodiment.

FIG. 8 is a diagram illustrating the GUI displaying the playlist after the profile score is updated with the replay score.

FIG. 11 is a diagram illustrating another embodiment for displaying the profile score and the replay score using a graphical representation.

FIG. 12 is a diagram of the GUI displaying a playlist that has been sorted by a category other than score according to one embodiment.

FIG. 13 is a diagram of the GUI displaying a playlist that has been sorted based on recalculated scores and then by the category User according to one embodiment.

DETAILED DESCRIPTION

The present invention relates to methods and systems for visually indicating a replay status of media items on a media device. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

Figure 1:
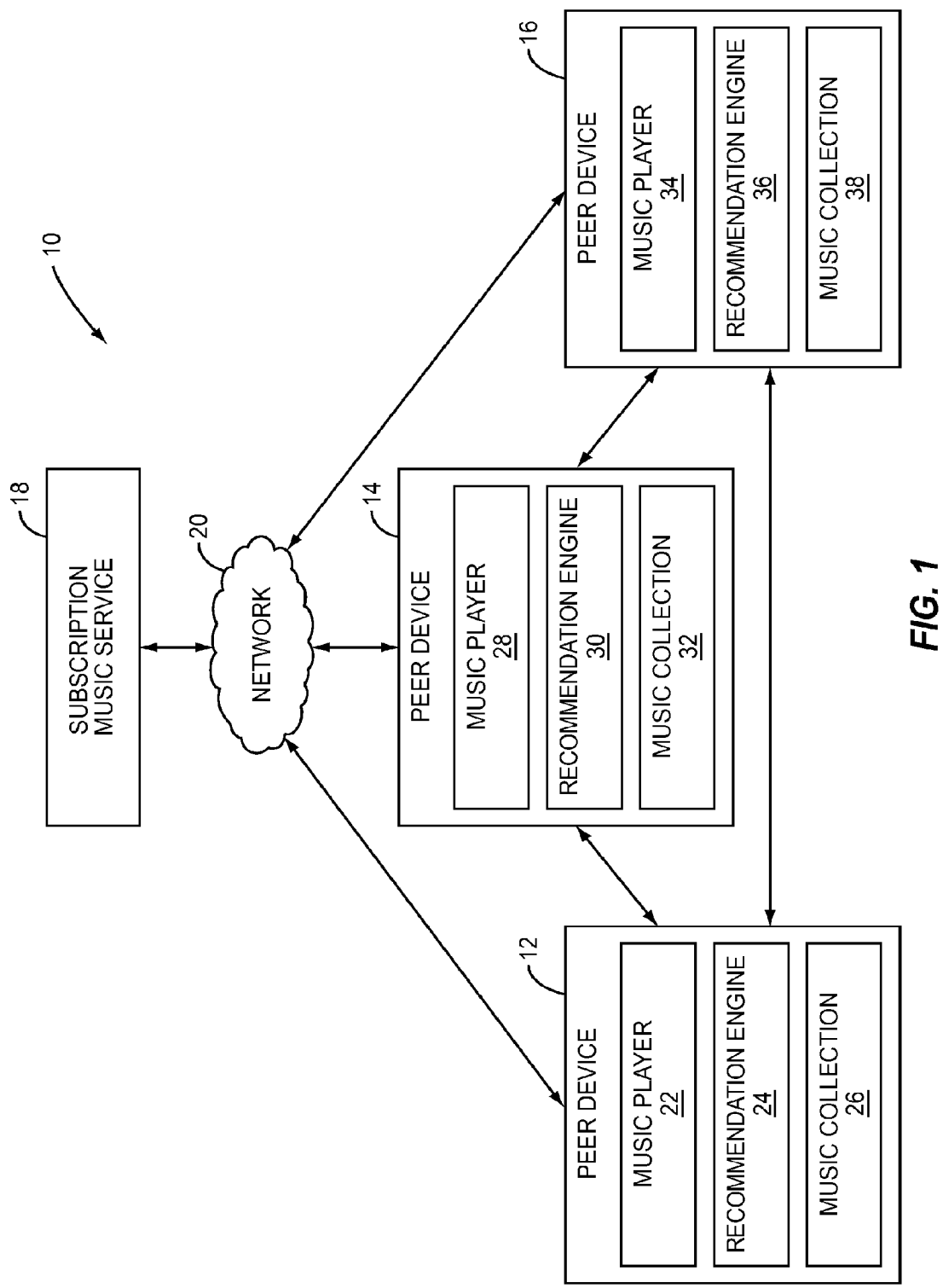
FIG. 1 illustrates a system incorporating a peer-to-peer (P2P) network for real time media recommendations according to one embodiment.

FIG. 1 illustrates a system 10 incorporating a P2P network for providing real time media recommendations according to one embodiment of the present invention. Note that while the exemplary embodiments focus on song recommendations for clarity and ease of discussion, the present invention is equally applicable to providing recommendations for other types of media items, such as video presentations and slideshows. Exemplary video presentations are movies, television programs, and the like. In general, the system 10 includes a number of peer devices 12-16 that are capable of presenting or playing the media items and which are optionally connected to a subscription music service 18 via a network 20, such as, but not limited to, the Internet. Note that while three peer devices 12-16 are illustrated, the present invention may be used with any number of two or more peer devices.

In this embodiment, the peer devices 12-16 are preferably portable devices such as, but not limited to, portable audio players, mobile telephones, Personal Digital Assistants (PDAs), or the like having audio playback capabilities. However, the peer devices 12-16 may alternatively be stationary devices such as a personal computer or the like.

The peer devices 12-16 include local wireless communication interfaces (FIG. 14) communicatively coupling the peer devices 12-16 to form a peer-to-peer (P2P) network. The wireless communication interfaces may provide wireless communication according to, for example, one of the suite of IEEE 802.11 standards, the Bluetooth standard, or the like. Because the peer devices 12-16 are capable of presenting or playing media items whether or not coupled to the P2P network, the peer devices 12-16 may be considered simply as media devices.

The peer device 12 may include a music player 22, a recommendation engine 24, and a music collection 26. The music player 22 may be implemented in software, hardware, or a combination of hardware and software. In general, the music player 22 operates to play songs from the music collection 26. The recommendation engine 24 may be implemented in software, hardware, or a combination of hardware and software. The recommendation engine 24 may alternatively be incorporated into the music player 22. The music collection 26 includes any number of song files stored in one or more digital storage units such as, for example, one or more hard-disc drives, one or more memory cards, internal Random-Access Memory (RAM), one or more associated external digital storage devices, or the like.

In operation, each time a song is played by the music player 22, the recommendation engine 24 operates to provide a recommendation identifying the song to the other peer devices 14, 16 via the P2P network. The recommendation does not include the song. In one embodiment, the recommendation may be a recommendation file including information identifying the song. In addition, as discussed below in detail, the recommendation engine 24 operates to programmatically, or automatically, select a next song to be played by the music player 22 based on the recommendations received from the other peer devices 14, 16 identifying songs recently played by the other peer devices 14, 16 and user preferences associated with the user of the peer device 12.

Like the peer device 12, the peer device 14 includes a music player 28, a recommendation engine 30, and a music collection 32, and the peer device 16 includes a music player 34, a recommendation engine 36, and a music collection 38.

The subscription music service 18 may be a service hosted by a server connected to the network 20. Exemplary subscription based music services that may be modified to operate according to the present invention are Yahoo! Music Unlimited digital music service and RealNetwork's Rhapsody digital music service.

Figure 2:
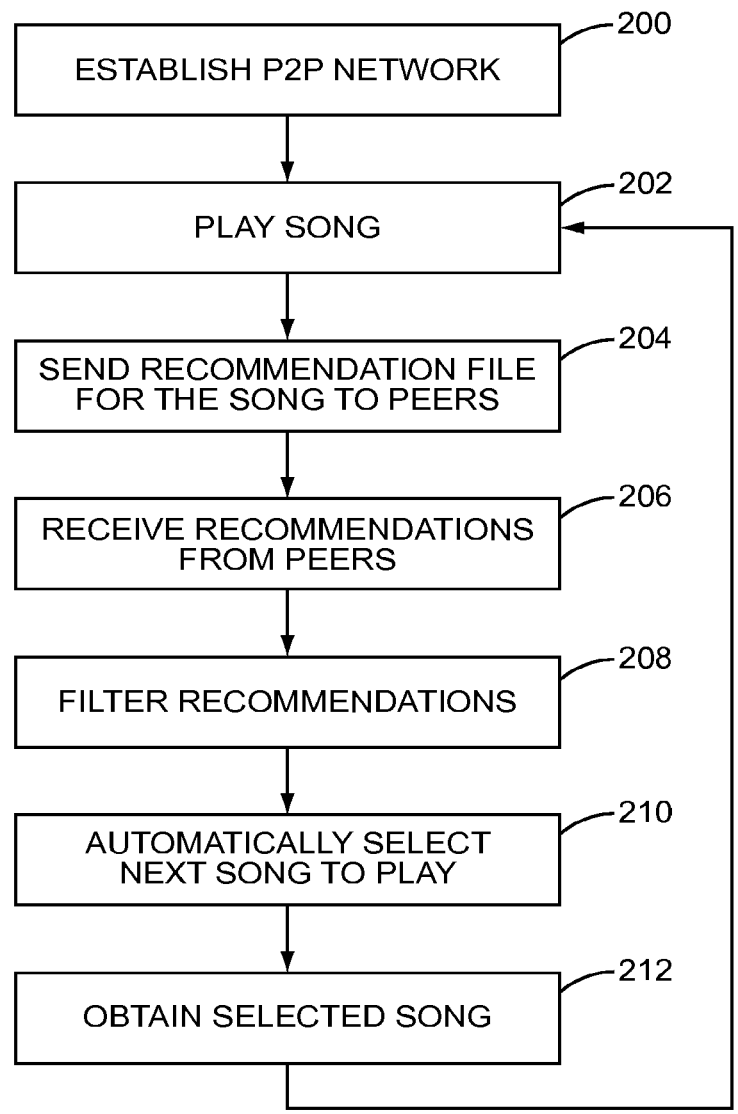
FIG. 2 is a flow diagram illustrating the operation of the peer devices of FIG. 1 according to one embodiment.

FIG. 2 is a flow diagram illustrating operation of the peer device 12 according to one embodiment of the present invention. However, the following discussion is equally applicable to the other peer devices 14, 16. First, the peer devices 12-16 cooperate to establish a P2P network (step 200). The P2P network may be initiated using, for example, an electronic or verbal invitation. Invitations may be desirable when the user wishes to establish the P2P network with a particular group of other users, such as his or her friends. Note that this may be beneficial when the user desires that the music he or she listens to be influenced only by the songs listened to by, for example, the user's friends. Invitations may also be desirable when the number of peer devices within a local wireless coverage area of the peer device 12 is large. As another example, the peer device 12 may maintain a "buddy list" identifying friends of the user of the peer device 12, where the peer device 12 may automatically establish a P2P network with the peer devices of the users identified by the "buddy list" when the peer devices are within a local wireless coverage area of the peer device 12.

Alternatively, the peer device 12 may establish an ad-hoc P2P network with the other peer devices 14, 16 by detecting the other peer devices 14, 16 within the local wireless coverage area of the peer device 12 and automatically establishing the P2P network with at least a subset of the detected peer devices 14, 16. In order to control the number of peer devices within the ad-hoc P2P network, the peer device 12 may compare user profiles of the users of the other peer devices 14, 16 with a user profile of the user of the peer device 12 and determine whether to permit the other peer devices 14, 16 to enter the P2P network based on the similarities of the user profiles.

At some point after the P2P network is established, the peer device 12 plays a song (step 202). Initially, before any recommendations have been received from the other peer devices 14, 16, the song may be a song from the music collection 26 selected by the user of the peer device 12. Prior to, during, or after playback of the song, the recommendation engine 24 sends a recommendation identifying the song to the other peer devices 14, 16 (step 204). The recommendation may include, but is not limited to, information identifying the song such as a Globally Unique Identifier (GUID) for the song, title of the song, or the like; a Uniform Resource Locator (URL) enabling other peer devices to obtain the song such as a URL enabling download or streaming of the song from the subscription music service 18 or a URL enabling purchase and download of the song from an e-commerce service; a URL enabling download or streaming of a preview of the song from the subscription music service 18 or a similar e-commerce service; metadata describing the song such as ID3 tags including, for example, genre, the title of the song, the artist of the song, the album on which the song can be found, the date of release of the song or album, the lyrics, and the like.

The recommendation may also include a list of recommenders including information identifying each user having previously recommended the song and a timestamp for each recommendation. For example, if the song was originally played at the peer device 14 and then played at the peer device 16 in response to a recommendation from the peer device 14, the list of recommenders may include information identifying the user of the peer device 14 or the peer device 14 and a timestamp identifying a time at which the song was played or recommended by the peer device 14, and information identifying the user of the peer device 16 or the peer device 16 and a timestamp identifying a time at which the song was played or recommended by the peer device 16. Likewise, if the peer device 12 then selects the song for playback, information identifying the user of the peer device 12 or the peer device 12 and a corresponding timestamp may be appended to the list of recommenders.

The peer device 12, and more specifically the recommendation engine 24, also receives recommendations from the other peer devices 14, 16 (step 206). The recommendations from the other peer devices 14, 16 identify songs played by the other peer devices 14, 16. Optionally, the recommendation engine 24 may filter the recommendations from the other peer devices 14, 16 based on, for example, user, genre, artist, title, album, lyrics, date of release, or the like (step 208).

The recommendation engine 24 then automatically selects a next song to play from the songs identified by the recommendations received from the other peer devices 14, 16, optionally songs identified by previously received recommendations, and one or more songs from the music collection 26 based on user preferences (step 210). In one embodiment, the recommendation engine 24 considers only those songs identified by recommendations received since a previous song selection. For example, if the song played in step 202 was a song selected by the recommendation engine 24 based on prior recommendations from the peer devices 14, 16, the recommendation engine 24 may only consider the songs identified in new recommendations received after the song was selected for playback in step 202 and may not consider the songs identified in the prior recommendations. This may be beneficial if the complexity of the recommendation engine 24 is desired to be minimal such as when the peer device 12 is a mobile terminal or the like having limited processing and memory capabilities. In another embodiment, the recommendation engine 24 may consider all previously received recommendations, where the recommendations may expire after a predetermined or user defined period of time.

As discussed below, the user preferences used to select the next song to play may include a weight or priority assigned to each of a number of categories such as user, genre, decade of release, and location/availability. Generally, location identifies whether songs are stored locally in the music collection 26; available via the subscription music service 18; available for download, and optionally purchase, from an e-commerce service or one of the other peer devices 14, 16; or are not currently available where the user may search for the songs if desired. The user preferences may be stored locally at the peer device 12 or obtained from a central server via the network 20. If the peer device 12 is a portable device, the user preferences may be configured on an associated user system, such as a personal computer, and transferred to the peer device 12 during a synchronization process. The user preferences may alternatively be automatically provided or suggested by the recommendation engine 24 based on a play history of the peer device 12. In the preferred embodiment discussed below, the songs identified by the recommendations from the other peer devices 14, 16 and the songs from the music collection 26 are scored or ranked based on the user preferences. Then, based on the scores, the recommendation engine 24 selects the next song to play.

Once the next song to play is selected, the peer device 12 obtains the selected song (step 212). If the selected song is part of the music collection 26, the peer device 12 obtains the selected song from the music collection 26. If the selected song is not part of the music collection 26, the recommendation engine 24 obtains the selected song from the subscription music service 18, an e-commerce service, or one of the other peer devices 14, 16. For example, the recommendation for the song may include a URL providing a link to a source from which the song may be obtained, and the peer device 12 may obtain the selected song from the source identified in the recommendation for the song. Once obtained, the selected song is played and the process repeats (steps 202-212).

Figure 3:
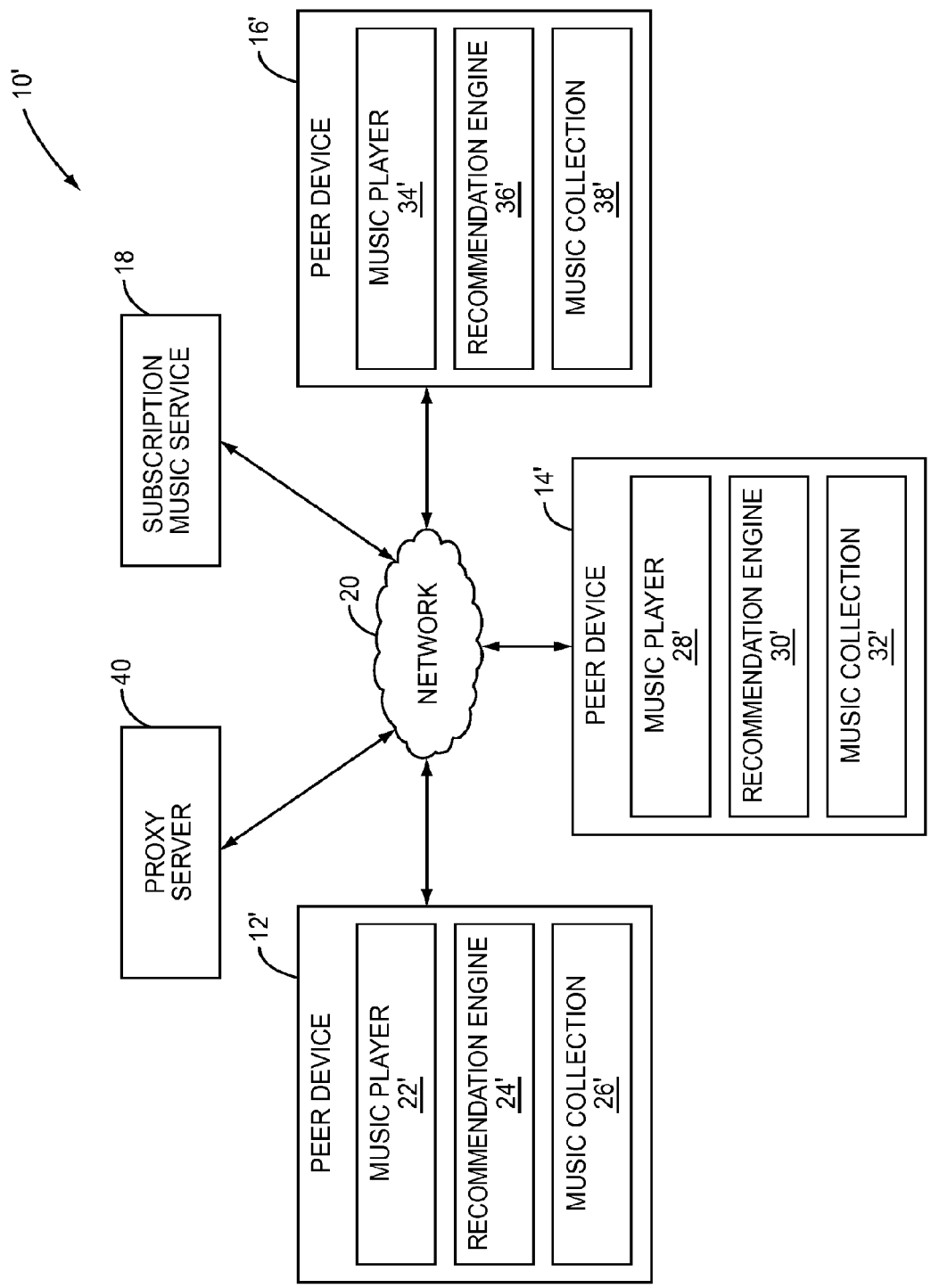
FIG. 3 illustrates the system 10' according to a second embodiment of the present invention.

FIG. 3 illustrates the system 10' according to a second embodiment of the present invention. In this embodiment, the peer devices 12'-16' form a P2P network via the network 20 and a proxy server 40. The peer devices 12'-16' may be any device having a connection to the network 20 and audio playback capabilities. For example, the peer devices 12'-16' may be personal computers, laptop computers, mobile telephones, portable audio players, PDAs, or the like having either a wired or wireless connection to the network 20. As discussed above with respect to the peer device 12, the peer device 12' includes music player 22', a recommendation engine 24', and a music collection 26'. Likewise, the peer device 14' includes a music player 28', a recommendation engine 30', and a music collection 32', and the peer device 16' includes a music player 34', a recommendation engine 36', and a music collection 38.

Figure 4:
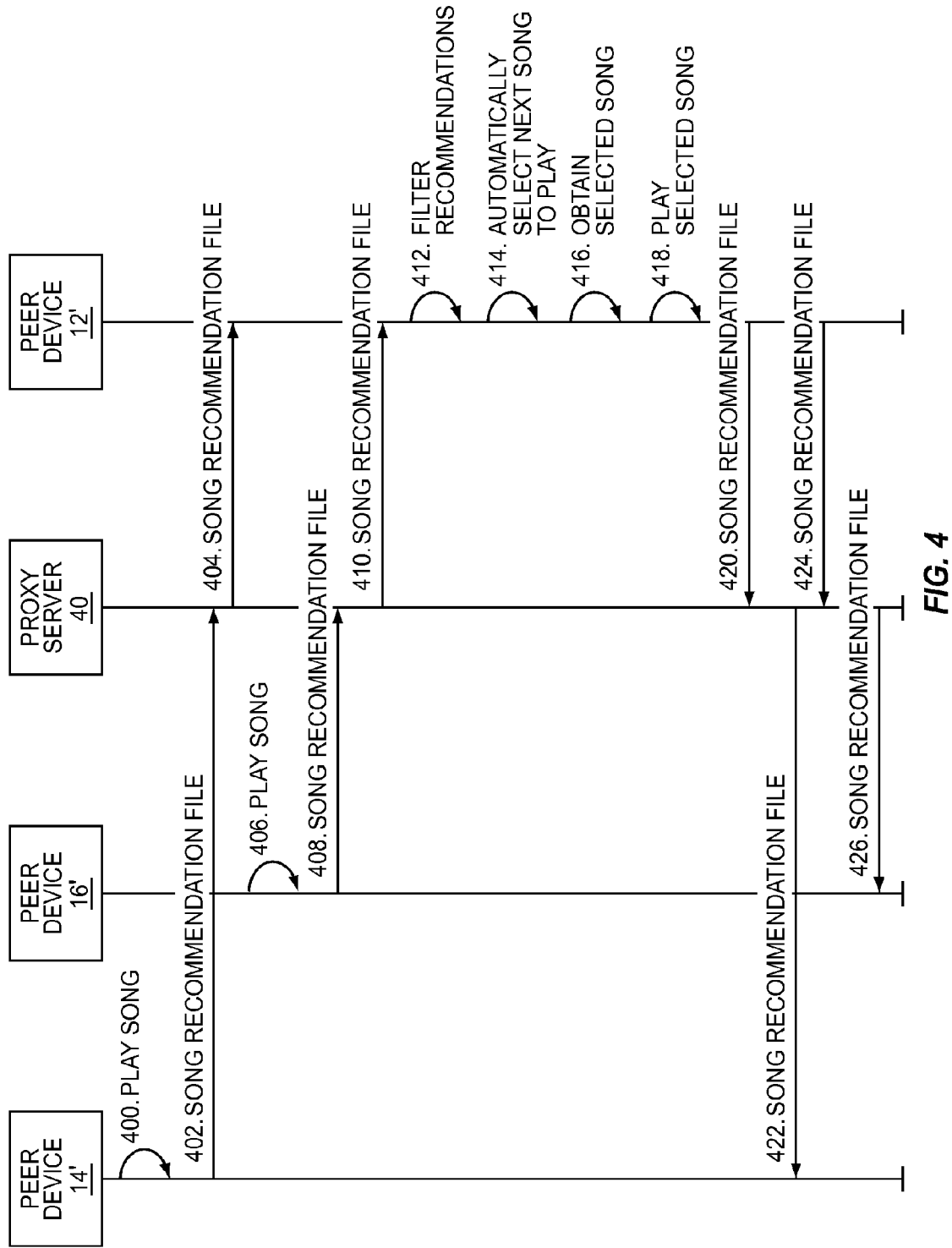
FIG. 4 illustrates the operation of the system of FIG. 3 according to one embodiment.

FIG. 4 is a flow diagram illustrating operation of the system 10' as shown in FIG. 3. In this example, once the P2P network is established, the peer device 14' plays a song and, in response, provides a song recommendation identifying the song to the peer device 12' via the proxy server 40 (steps 400-404). While not illustrated for clarity, the peer device 14' also sends the recommendation for the song to the peer device 16' via the proxy server 40. The peer device 16' also plays a song and sends a song recommendation to the peer device 12' via the proxy server 40 (steps 406-410). Again, while not illustrated for clarity, the peer device 16' also sends the recommendation for the song to the peer device 14' via the proxy server 40. From this point, the process continues as discussed above.

Figure 5:
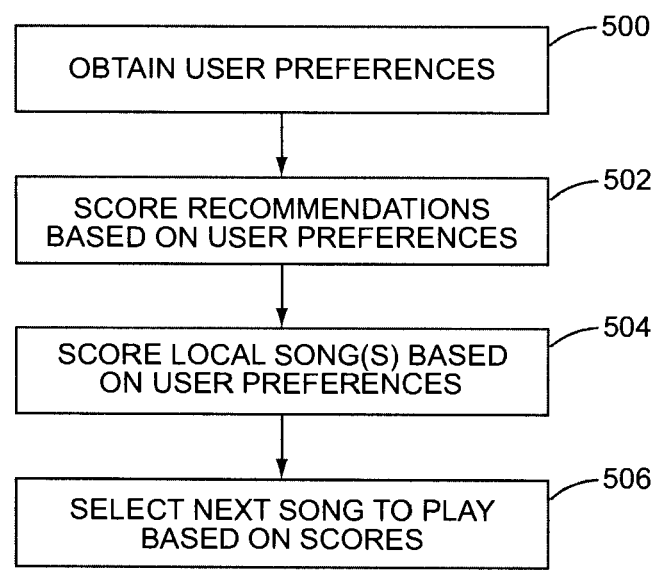
FIG. 5 is a flow diagram illustrating a method for automatically selecting media items to play based on recommendations from peer devices and user preferences according to one embodiment of the present invention.

FIG. 5 illustrates a process of automatically selecting a song to play from the received recommendations and locally stored songs at the peer device 12' according to one embodiment of the present invention. However, the following discussion is equally applicable to the peer devices 12-16 of FIG. 1, as well as the other peer devices 14'-16' of FIG. 3. First, the user preferences for the user of the peer device 12' are obtained (step 500). The user preferences may include a weight or priority assigned to each of a number of categories such as, but not limited to, user, genre, decade of release, and location/availability. The user preferences may be obtained from the user during an initial configuration of the recommendation engine 24'. In addition, the user preferences may be updated by the user as desired. The user preferences may alternatively be suggested by the recommendation engine 24' or the proxy server 40 based on a play history of the peer device 12'. Note that proxy server 40 may ascertain the play history of the peer device 12' by monitoring the recommendations from the peer device 12' as the recommendations pass through the proxy server 40 on their way to the other peer devices 14'-16'. The user preferences may be stored locally at the peer device 12' or obtained from a central server, such as the proxy server 40, via the network 20.

Once recommendations are received from the other peer devices 14'-16', the recommendation engine 24' of the peer device 12' scores the songs identified by the recommendations based on the user preferences (step 502). The recommendation engine 24' also scores one or more local songs from the music collection 26' (step 504). The recommendation engine 24' then selects the next song to play based, at least in part, on the scores of the recommended and local songs (step 506).

FIG. 6 illustrates an exemplary graphical user interface (GUI) 42 for displaying a playlist for the peer devices including both local and recommended media items according to an exemplary embodiment. In this example, the media items displayed in the playlist are songs, and information for each song is displayed in several category fields of the playlist. In this embodiment, the categories are users, genre, decade, and location/availability, but it may include other types of categories. In this example, the peer device 12' plays media items from a playlist that includes a mixture of items selected by the user of the device (in this case Hugh) and recommended media items from the user's friends (in this case Gary, Gene, Mike, and Waymen). The playlist is continually updated as recommendations are received. Note that the playlist shows a mixture of the media items that are on the user's machine (designated by a location Local) and items that have been recommended from friends (Gary, Gene, Mike, and Waymen) that may need to be downloaded, or can be streamed from within the music subscription service 18.

In this example, both the local and recommended songs are scored based on the category weights, and sorted according to their scores. The weights for the categories may be assigned manually by the user via a GUI of the peer device 12 or a website (e.g., subscription music service 18), or assigned based on a user profile. In an exemplary embodiment, the peer device 12' always plays the item with the highest score, which in this embodiment is the song at the top of the playlist.

Media items can be scored a number of different ways utilizing various mechanisms and formulas. According to an exemplary embodiment, one equation for scoring the media items as a function of the weighted categories (and subcategories) is:

$$\text{Score} = \left(\frac{1}{10}\right) \cdot \left(\frac{1}{(WD + WG + WL + WU)}\right) \cdot$$
$$(WD \cdot WDA + WG \cdot WGA + WL \cdot WLA + WU \cdot WUA) \cdot 100$$

where WU is the weight assigned to the user category; WUA is the weight assigned to the user attribute of the song, which is the user recommending the song (e.g., Hugh, Gary, Gene, et al); WG is the weight assigned to the genre category; WGA is the weight assigned to the genre attribute of the song, which is the genre of the song (e.g., Alternative, Rock, Jazz, Punk, etc.); WD is the weight assigned to the decade category; WDA is the weight assigned to the decade attribute of the song, which is the decade in which the song or the album associated with the song was released (e.g., 1960, 1970, etc.); WL is the weight assigned to the location/availability category; and WLA is the weight assigned to the location/availability attribute of the song, which is the location or availability of the song (e.g., Local, Subscription, Download, etc.).

As an example, assume that the following weights have been assigned to the categories as follows:

| | |
|---|---|
| User Category | 1 |
| Genre Category | 7 |
| Decade Category | 7 |
| Location/Availability Category | 5 |

Further assume that attributes for the categories have been assigned weights as follows:

| User | | Genre | | Decade | | Location/Availability | |
|---|---|---|---|---|---|---|---|
| Hugh | 9 | Alternative | 8 | 1950s | 2 | Local | 8 |
| Gary | 5 | Classic Rock | 5 | 1960s | 4 | Subscription Network | 2 |
| Gene | 5 | Arena Rock | 5 | 1970s | 7 | Buy/Download | 1 |
| | | Jazz | 5 | 1980s | 9 | Find | 1 |
| | | New Wave | 2 | 1990s | 5 | | |
| | | Punk | 4 | 2000s | 5 | | |
| | | Dance | 2 | | | | |
| | | Country | 2 | | | | |

Inserting these weights into the score equation for the song "Say Hey" in FIG. 6 yields:

$$\text{Score} = \left(\frac{1}{10}\right) * \left(\frac{1}{(7+7+5+1)}\right) * (7*9 + 7*8 + 5*8 + 1*9) * 100$$

$$\text{Score} = \left(\frac{1}{10}\right) * \left(\frac{1}{20}\right)(63 + 56 + 40 + 9) * 100$$

$$\text{Score} = \left(\frac{1}{10}\right) * \left(\frac{1}{20}\right) * (168) * 100$$

$$\text{Score} = 84$$

In the playlist shown in FIG. 6, note that the song "Say Hey" by "The Tubes" is the first item played in the playlist because it has the highest score according to the category weights described above. In one embodiment the score is calculated based on the category weights in the user's preferences or profile. The score is referred to hereinafter as a profile score. However, those with ordinary skill in the art will readily recognize that the profile score may be based on other factors other than category weights.

Scoring and Affecting the Replay of Recommended Media Items Using a No Repeat Factor It would be undesirable to most users if any particular media item is repeatedly replayed within a short time interval. However, if the peer device 12' plays the media item with the highest profile score and the user does not receive any new recommendations with a higher profile score than the media item already played, then the peer device 12' could repeatedly play the same media item, absent a mechanism for altering replay of media items.

According to a further aspect of the invention, in response to each one of the media items being played, the peer device 12' calculates a respective replay score for the media item that affects or influences replay of the media item. In one embodiment, the replay score is calculated at least in part as a function of a no repeat factor (NRF). The replay scores of the media items can then be used to sort the media items for playing.

In one embodiment, the NRF is based on a user settable value. For example, a weighted no repeat (WNR) category may be assigned a value of 9 out of 10, meaning that the period between repeated playings should be longer rather than shorter. In another embodiment, the NRF may be based on the total number of media items in the playlist, rather than a fixed WNR.

Figure 7:
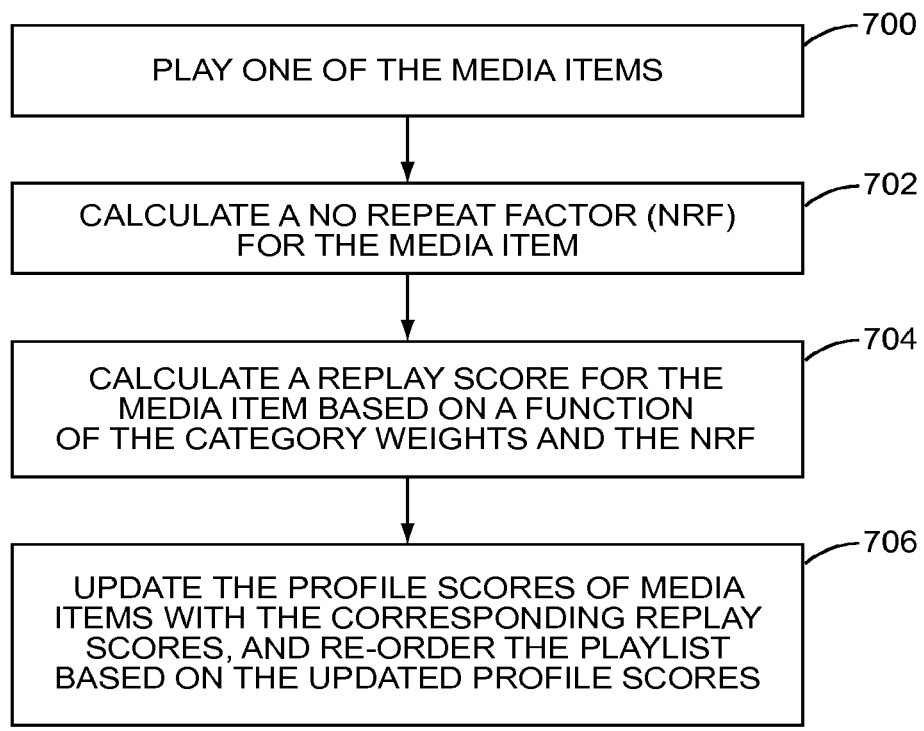
FIG. 7 is a flow diagram illustrating a process for scoring and controlling the replay of recommended media items using a no repeat factor according to an exemplary embodiment.

FIG. 7 is a flow diagram illustrating a process for scoring and affecting the replay of recommended media items using a no repeat factor according to one embodiment. The process assumes that the recommendation engine 24' has already calculated the profile scores of each of the media items in the playlist. The process begins in response to one of the media items being played (step 700), i.e., the song at the top of the playlist, at which time the recommendation engine 24' calculates a no repeat factor (NRF) for the media item as a function of the weighted no repeat (WNR) value (step 702).

In one embodiment the NRF may be calculated using the formula:

$$NRF = \frac{MIN(10 \cdot WNR, \text{LASTREPEAT\_INDEX})}{10 \cdot WNR}$$

where the LastRepeat_Index is preferably based on one or both of a count of the number of media items played since the last play of the media item, or a predetermined time period, e.g., 2 hrs, 5 hrs, 1 day, and so on.

For example, referring to the playlist shown in FIG. 6, after "Say Hey" has been played, the number of songs since this song was last played is now 1. Assuming the weighted no repeat value (WNR) is 9, the NRF can be computed as follows:

No Repeat Factor=Min[10*WNR,LastRepeat_Index]/(10*WNR)

No Repeat Factor=Min [10*9,1]/(10*9)

No Repeat Factor=1/(10*9)

No Repeat Factor=0.0111

In this embodiment, it should be understood that the weighted no repeat (WNR) value may be a global variable that applies equally to each of the user's media items, while the last repeat index and the corresponding no repeat factor (NRF) may be different for each of the media items. Each time a media item is played, the last repeat index is incremented/decremented or calculated for each of the media items that have already been played. For example, if the last repeat index is based on the number of songs played since the last play of the media item, then the last repeat index is incremented. If the last repeat index is based on a predetermined time period, then the last repeat index could be calculated to determine how much time has passed since the last play of the media item, e.g., based on the difference between the time the last play occurred and the current time.

As stated above, in one embodiment the NRF may be based on the number of media items in the playlist, which is dynamic. In this embodiment, the WNR can be replaced by the total number of media items in the playlist, which ensures that each item will not be repeated based in part until most or all of the other items have been played. Thus, the NRF scales naturally to the size of the playlist.

Next, the recommendation engine 24' calculates a replay score for the media item (as well as for the other previously played media items) based on a function of the category weights and the NRF (step 704). In one embodiment, the replay score may be computed using the equation:

Replay Score=NRF*(1/10)*(1/(WD+WG+WL+WU))*
   (WD*WDA+WG*WGA+WL*WLA+
   WU*WUA)*100

Continuing with the example playlist shown in FIG. 6, the replay score for the song "Say Hey" immediately after it was played (or while it was playing) and after computation of the NRF would be:

Replay Score=(0.011)*(1/10)*(1/(7+7+5+1))*(7*9+
   7*8+5*8+1*9)*100

Replay Score=(0.011)*(1/10)*(1/20)*(63+56+
   40+9)*100

Replay Score=(0.011)*(1/10)*(1/20)*(168)*100

Replay Score=0.9

Replay Score~=1

Referring again to FIG. 7, in one embodiment, the recommendation engine 24' updates the profile scores of media items with the corresponding replay scores, and re-orders the playlist based on the updated profile scores (step 706).

FIG. 8 is a diagram illustrating the GUI 42 displaying the playlist after the profile score for the song "Say Hey" is updated with the replay score. Since the song "Say Hey" has a replay score of 1, and the replay score is used to update the profile score, the profile score becomes 1, and the song "Say Hey" drops to the bottom of the playlist, ensuring that the song will not be repeated before other songs have a chance to play.

The first aspect of the exemplary embodiment provides a P2P network for real-time media recommendations in which peer devices constantly receive recommendations of media items from other peer devices; intersperses the recommendations with an existing playlist of media items designated by a user; dynamically calculates both a profile score of each of the media items according to the user's preferences, and a replay score for previously played media items that affects replay of the media items; and uses the replay score to update the profile score in order to play the media items back in score order. This embodiment ensures that there are no repetitions of played media items until the user has had at least some exposure to other recommended media items in the playlist.

Visually Indicating a Replay Status of a Media Item

While the replay score ensures that the user will have some exposure to other media items in the playlist before repeating the media items that have already been played, the replay score can sometimes have the effect of hiding the media items that the user most likely will enjoy by placing those items at the end of the playlist. Continuing with the example given above, for instance, the song "Say Hey" had an original profile score of 84 and was the highest in the playlist. This means that "Say Hey" was most likely a song that the user (Hugh) was going to enjoy from the list, given the category weights that the user entered in the system (this assumes that the user has set the weights in the system to yield songs that most closely match his tastes). Once the song has been played, though, the replay score is calculated, and the song "Say Hey" has a score of 1. The user might forget that this song was once at the top of the list, given its current score.

Accordingly, a further aspect of the present invention provides a mechanism for visually indicating the replay status of a media item by letting the user see the original profile score of the media item as well as the current replay score, as determined, for example, by the no repeat factor. In this embodiment, the peer devices 12-16 retain the two scores and provide a GUI to clearly indicate both pieces of information to the user. By displaying the replay score, the user is apprised of the replay status of one or all of the media items.

Figure 9:
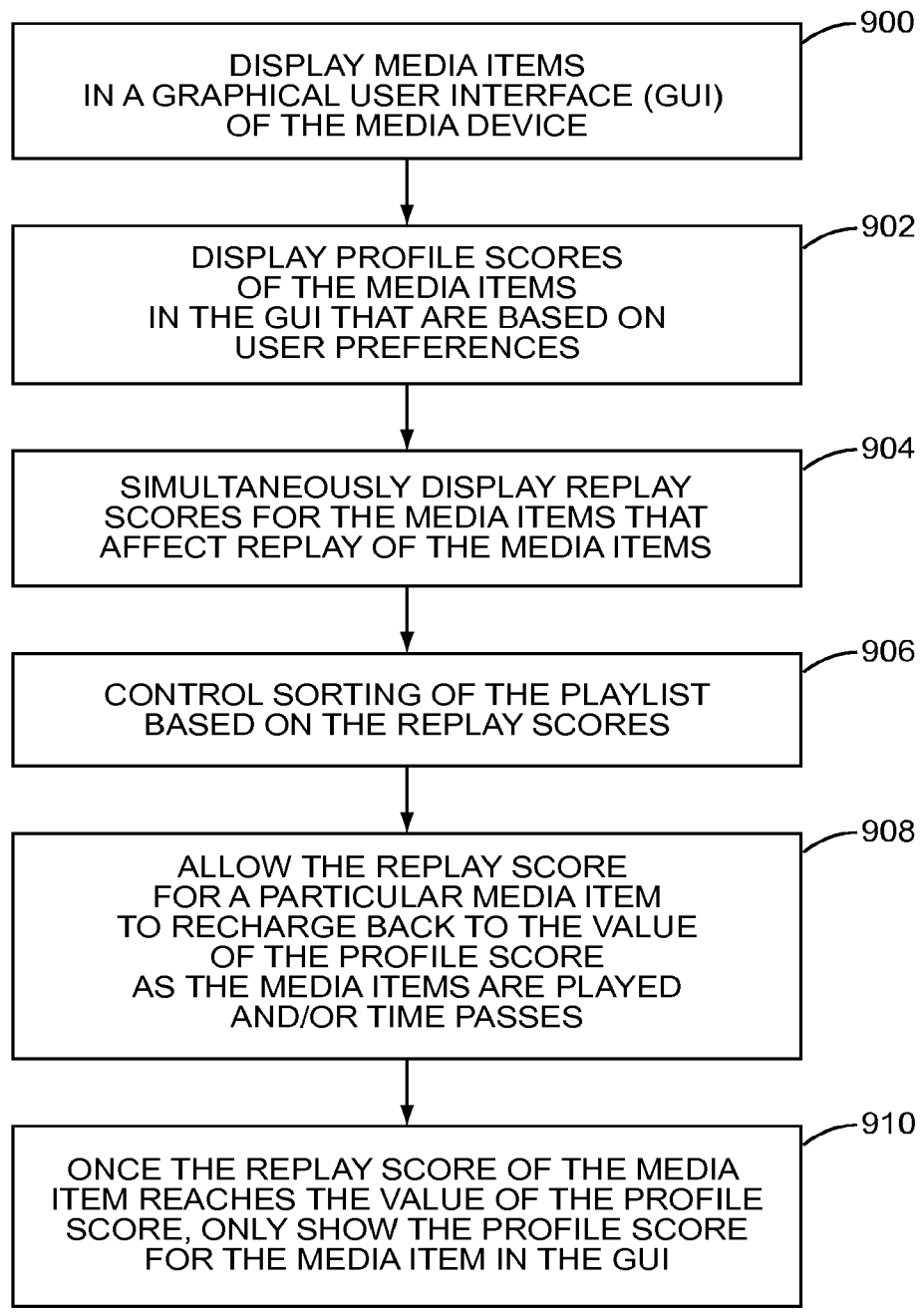
FIG. 9 is a flow diagram illustrating a process for visually indicating a replay status of media items on a media device.

FIG. 9 is a flow diagram illustrating a process for visually indicating a replay status of media items on a media device. The process begins by displaying the media items in a graphical user interface (GUI) of the media device (step 900). As shown in FIGS. 6 and 8, in the exemplary embodiment, the GUI displays the media items in a playlist, which are represented by text information, such as song title. However, the media items could also be displayed with graphical representations, such as icons and/or pictures (e.g., album covers).

As also described above, the profile scores of the media items that are calculated based on user preferences are also displayed in the GUI 42 (step 902). However, according to this embodiment, the GUI 42 can also display the replay scores for the media items that affect the replay of the media items (step 904). As described above, the replay scores can be based on corresponding no repeat factors (NRF), which in turn, can be derived from either a predetermined time period and/or a count of media items that have been played since the first media item was last played.

The media items are sorted in the playlist based on the replay scores (step 906). In one embodiment, all media items in the playlist are provided with replay scores whether or not the media item has been played, with the initial values for replay scores being set equal to the profile score of the corresponding media item. In another embodiment, all the media items have a profile score, but replay scores are only calculated after the corresponding media items have been played. In this case, the sorting can be controlled by the replay scores for previously played media items that have respective replay scores, and by the profile score for the media items that have not yet been played on the peer device and only have profile scores (step 906). As a practical matter, during operation of the peer device, the sorting of the playlist (step 906) may occur prior to display of the playlist (steps 902-904).

Based on the above, it should become apparent that the profile score is a relatively fixed value that is determined through the interaction of the user's profile/preferences with a given media item. However, the replay score is a dynamic value that will normally range between, but is not limited to, a maximum of the profile score and a lesser value determined by the no repeat factor (NRF).

There are several embodiments for indicating both the profile score and the replay score for each media item. In one embodiment, a representation of the replay score relative to the profile score is displayed in association with the media item.

Figure 10:
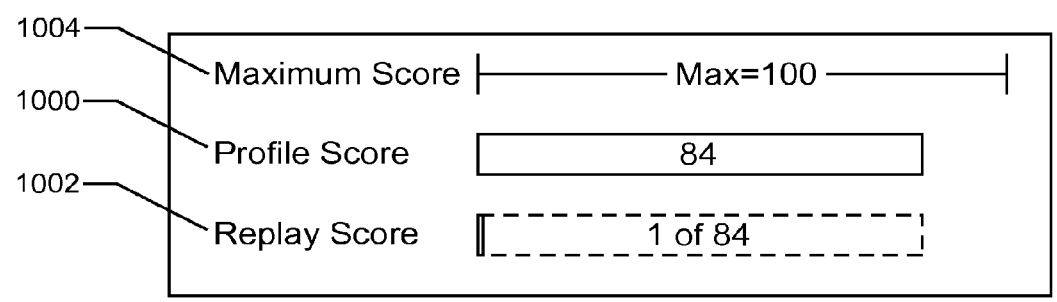
FIG. 10 is a diagram illustrating one embodiment for displaying the profile score and the replay score in a GUI using a graphical representation.

FIG. 10 is a diagram illustrating one embodiment for displaying the profile score and the replay score in a GUI using a graphical representation. In this embodiment, the profile score 1000 and replay score 1002 are shown displayed using bar graphs. One bar graph displays the profile score 1000 relative to a maximum profile score 1004 (e.g., max. 100), and a second bar graph displays the replay score 1002 relative to the profile score 1000. In this example, the second bar graph is shown having a length that indicates the profile score 1000 and a shaded subsection that indicates the replay score 1002. In addition, the second bar graph is also shown to display numeric values for both the profile score 1000 and replay score 1002, e.g., "1 of 84".

FIG. 11 is a diagram illustrating another embodiment for displaying the profile score 1000 and the replay score 1002 using a graphical representation. In this embodiment, the profile score 1000 and the replay score 1002 are displayed in the single bar graph of FIG. 10 that shows both the profile score 1000 and the replay score 1002, which makes it suitable for display in the playlist GUI 42 next to each media item.

Although bar graphs have been described for graphically illustrating the profile score 1000 and the replay score 1002, the profile score 1000 and the replay score 1002 could be displayed using other graphic representations, such as a pie chart. The profile score 1000 and the replay score 1002 may also be displayed with just text information. For example, the replay score 1002 may be displayed as a percentage of the profile score, such as 4.5%, for instance.

Referring again to FIG. 9, the calculation of the NRF is such that the replay score 1002 for a particular media item is allowed to recharge back to the value of the profile score 1000 as media items are played and/or time passes (step 908) with a corresponding display in the display of the scores. For example, as shown in FIG. 11, four songs have played since the first playing of the song "Say Hey", and the replay score 1002 for the song has increased accordingly from an initial value of 1 to a current value of 5.

Referring again to FIG. 9, once the replay score 1002 of the media item reaches the value of the profile score 1000, only the profile score 1000 for the media item is shown in the GUI (step 910).

Given the above description of the profile and replay scores 1002, it should be apparent that the exemplary embodiments cover alternative embodiments that include a wider range of category weightings and accompanying profile scores 1000 and presentation factors controlling playback beyond the no repeat factor (NRF), such as for example, a methodology that attempts to force play back of a media item based solely on time, such as at least once per week or alternatively, no more often than once per day. Also, although described in terms of a P2P media recommendation environment, the exemplary embodiments may be applied to media devices in traditional client/server environments as well.

Sorting Recommended Media Items in a Scored Playlist

One purpose of the P2P networked media recommendation system 10 is to provide a music discovery mechanism for the user. While one purpose of creating a playlist of recommendations is the creation of a musical journey for the user, it is entirely possible that users of the media recommendation system 10 may want to sort on different categories as a means to quickly peruse the recommendations that have been received from their peers. For example, maybe the user Hugh would like to quickly see how many recommendations have been received by a particular friend (Waymen) and the associated scores 1000 and 1002 of such media items.

FIG. 12 is a diagram of the GUI 42 displaying a playlist that has been sorted by a category other than score according to one embodiment. Sorting in this fashion can pose a potential problem for the media recommendation system 10 since the media recommendation system 10 is designed to play the first media item in the sorted playlist. If the user sorts by some column other than score, then it is possible the peer devices 12-16 will begin playing media items that are either (1) not the media items most likely to match the user's tastes or (2) may be media items that have already been played before (thereby eliminating the music discovery aspects of the application).

According to a further aspect of the exemplary embodiment, embodiments for sorting the playlist are provided that maintain the system's purpose as a media discovery device by accepting media recommendations from a user's peers and by ranking those recommendations for playback by score, but also allows the user to indicate a sort criteria other than score. The media items are then sorted for playback based on a combination of both the score and the indicated sort criteria.

In one embodiment, the peer devices 12-16 permit the sorting of the playlist by different category columns, but only subordinate to a sort by score. In this embodiment, each of the media items include a profile score 1000 and a replay score 1002. First, the peer devices 12-16 automatically sort the media items in the playlist by the replay scores 1002. As stated above, the replay score 1002 may be set equal to the profile score 1000 for the media items that have yet to be played. Second, the peer devices 12-16 sort the media items by a sort criteria indicated by a user. For example, if the user wants to sort on the User column, then the peer devices 12-16 perform a double sort where the media items in the playlist are first sorted by the profile and replay scores and then by User. Finally, the playlist is displayed and the media items in the playlist are played according to the sort order. The steps of sorting and displaying the playlist are not necessarily order dependent.

In a second embodiment, the peer devices 12-16 permit the user to sort the playlist by category columns other than score first and then sort by score second. In this embodiment, the peer devices 12-16 first sort the media items by a sort criteria indicated by a user. For example, the user may select a particular category to sort on by clicking one of the category columns in the playlist. Thereafter, the peer devices 12-16 sort the media items by the score associated with each of the media items, e.g., the profile and replay scores 1000 and 1002, and displays the sorted playlist. To preserve the integrity of the recommendation engine 24 as a music discovery device, the media items in the playlist are played according to sort order, but the media items that have already been played (as indicated by a corresponding replay score 1002), are automatically skipped.

In this particular case, the playlist would look similar to that of FIG. 12, which shows an example playlist that has been sorted by User first, and then sorted by score second. However, in this embodiment as songs are played by moving down the playlist, songs that have already been played are automatically skipped. Notice that in this embodiment, the media item being played is not necessarily the first item in the playlist, as in the case where the first media item is a replay score.

In a third embodiment, the peer devices 12-16 permit the user to sort the playlist by category columns other than score, but adjust the weight of the selected category so that the selected category has a greater weight than the other categories listed by the user. In response to receiving the user's selection of sort criteria, such as selecting a particular category to sort on by clicking one of the category columns in the playlist, a user preference associated with the sort criteria is changed. As described above, user preferences used to select the next song to play may include a weight assigned to each of a number of categories, such as user, genre, decade of release, and location/availability. The category weights are then used to score or rank the media items from the music collection 26.

As an example, suppose the user chooses to sort the playlist by User. Then, in this embodiment, the User weight (WU) may be increased automatically from its initial value of 1 (see FIG. 8) to near a maximum value, such as 9 for instance, thereby making it a dominant force in the user's preferences and calculation of the profile score 1000.

After the user preference associated with the sort criteria is changed, the profile score 1000 and any existing replay score 1002 are recalculated. The media items in the playlist are then first sorted by the recalculated replay scores 1002, as described above, and then sorted by the sort criteria selected by the user, e.g., by the category User. The sorted playlist is displayed and the media items are played in the playlist according to sort order.

FIG. 13 is a diagram of the GUI 42 displaying a playlist that has been sorted based on recalculated scores and then by the User category according to one embodiment. Because of the change in the weight assigned to the user category, the media items now have slightly different profile and replay scores 1000 and 1002.

Figure 14:
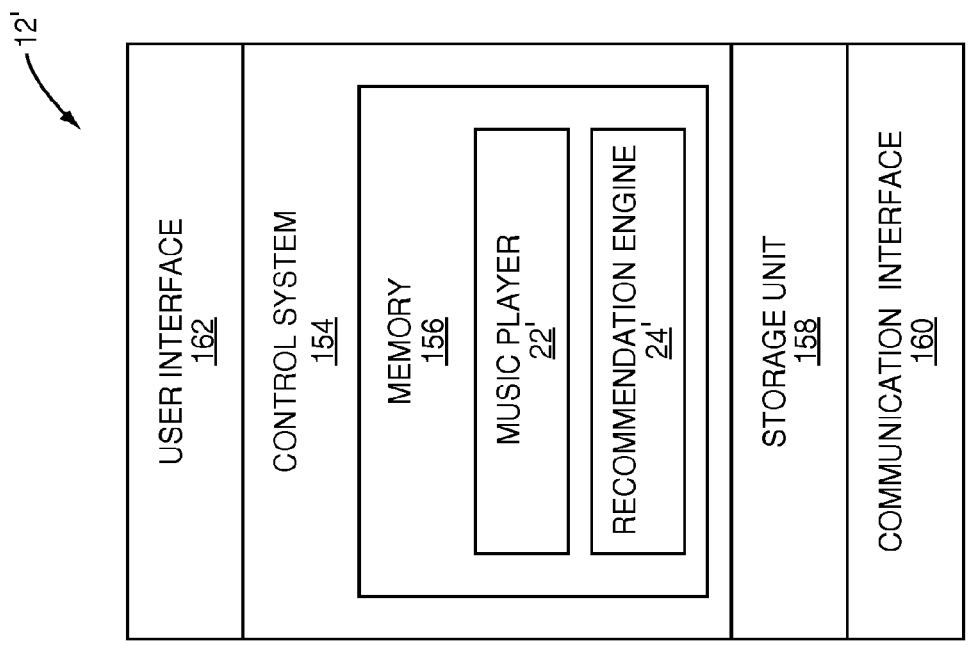
FIG. 14 is a block diagram of an exemplary embodiment of the peer device.

FIG. 14 is a block diagram of an exemplary embodiment of the peer device 12' of FIG. 3. However, the following discussion is equally applicable to the other peer devices 14'-16', as well as peer devices 12-16 of FIG. 1. In general, the peer device 12' includes a control system 154 having associated memory 156. In this example, the music player 22' and the recommendation engine 24' are at least partially implemented in software and stored in the memory 156. The peer device 12' also includes a storage unit 158 operating to store the music collection 26' (FIG. 3). The storage unit 158 may be any number of digital storage devices such as, for example, one or more hard-disc drives, one or more memory cards, RAM, one or more external digital storage devices, or the like. The music collection 26' may alternatively be stored in the memory 156. The peer device 12' also includes a communication interface 160. The communication interface 160 includes a network interface communicatively coupling the peer device 12' to the network 20 (FIG. 3). The peer device 12' also includes a user interface 162, which may include components such as a display, speakers, a user input device, and the like.

The present invention provides substantial opportunity for variation without departing from the spirit or scope of the present invention. For example, while FIG. 1 illustrates the peer devices 12-16 forming the P2P network via local wireless communication and FIG. 3 illustrates the peer devices 12'-16' forming the P2P network via the network 20, the present invention is not limited to either a local wireless P2P network or a WAN P2P network in the alternative. More specifically, a particular peer device, such as the peer device 12, may form a P2P network with other peer devices using both local wireless communication and the network 20. Thus, for example, the peer device 12 may receive recommendations from both the peer devices 14, 16 (FIG. 1) via local wireless communication and from the peer devices 14'-16' (FIG. 3) via the network 20.

A method and system for visually indicating a replay status of media items on a media device has been disclosed. The present invention has been described in accordance with the embodiments shown, and one of ordinary skill in the art will readily recognize that there could be variations to the embodiments that would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We claim:

1. A device for a media recommendation system, the device having a processor and comprising:
 a communication interface communicatively coupling the device to other devices in a network; and
 a control system operably executed by the processor, the control system associated with the communication interface and adapted to:
  display in a graphical user interface (GUI) of the device a representation of a first media item;

display a profile score of the first media item that is based on stored user preferences; and display a replay score for the first media item, wherein the profile score and the replay score are displayed approximately simultaneously.

2. The device of claim 1 wherein a plurality of the media items are displayed in a playlist with corresponding profile scores and replay scores.

3. The device of claim 2 wherein the media items are sorted in the playlist based on the profile scores and the replay scores, wherein the replay scores take precedence over the profile scores.

4. The device of claim 1 wherein a representation of the replay score relative to the profile score is displayed for the first media item.

5. The device of claim 4 wherein a graphic representation is displayed of at least one of the profile score and replay score.

6. The device of claim 5 wherein the graphic representation includes at least one of a graph and a chart.

7. The device of claim 6 wherein the control system is further adapted to:

display a first bar graph of the profile score relative to a maximum profile score; and display a second bar graph of the replay score.

8. The device of claim 6 wherein a single bar graph is displayed having a length indicating the profile score and a subsection indicating the replay score.

9. The device of claim 8 wherein the single bar graph also displays numeric values of both the profile score and replay score.

10. The device of claim 4 wherein the profile score and replay score are displayed as text.

11. The device of claim 10 wherein the replay score is displayed as a percentage of the profile score.

12. The device of claim 1 wherein in response to each one of the media items being played, a respective replay score is calculated for the corresponding media item if the corresponding media item does not already have a corresponding replay score; and the replay scores for previously played media items are recalculated.

13. The device of claim 12 wherein the replay score changes over time back to a value of the profile score.

14. The device of claim 13 wherein once the replay score of the first media item reaches the value of the profile score, only the profile score for the first media item is shown in the GUI.

15. The device of claim 1 wherein the profile score is based upon at least one preference associated with a user and comprising at least one category weight.

16. The device of claim 1 wherein the replay score is a function of the profile score and an amount of time since the first media item was last played.

17. A device for a media recommendation system, the device having a processor and comprising:

means for coupling the device to other devices in a network;

means for displaying in a graphical user interface (GUI) of the device a representation of a first media item;

means for displaying a profile score of the first media item that is based on stored user preferences; and means for displaying a replay score for the first media item, wherein the profile score and the replay score are displayed approximately simultaneously.

* * * * *